United States Patent
Lu et al.

(10) Patent No.: US 11,212,334 B2
(45) Date of Patent: Dec. 28, 2021

(54) MECHANISMS TO SUPPORT ADAPTIVE CONSTRAINED APPLICATION PROTOCOL (COAP) STREAMING FOR INTERNET OF THINGS (IOT) SYSTEMS

(71) Applicant: Convida Wireless, LLC, Wilmington, DE (US)

(72) Inventors: Guang Lu, Thornhill (CA); Chonggang Wang, Princeton, NJ (US); Shamim Akbar Rahman, Cote St. Luc (CA); Lijun Dong, San Diego, CA (US); Quang Ly, North Wales, PA (US); Xu Li, Plainsboro, NJ (US); Zhuo Chen, Claymont, DE (US); Vinod Kumar Choyi, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 250 days.

(21) Appl. No.: 15/739,399

(22) PCT Filed: Jun. 23, 2016

(86) PCT No.: PCT/US2016/038987
§ 371 (c)(1),
(2) Date: Dec. 22, 2017

(87) PCT Pub. No.: WO2016/210109
PCT Pub. Date: Dec. 29, 2016

(65) Prior Publication Data
US 2019/0075149 A1    Mar. 7, 2019

Related U.S. Application Data

(60) Provisional application No. 62/183,490, filed on Jun. 23, 2015.

(51) Int. Cl.
| | |
|---|---|
| *G06F 15/16* | (2006.01) |
| *H04L 29/06* | (2006.01) |
| *H04L 29/08* | (2006.01) |

(52) U.S. Cl.
CPC ........ *H04L 65/608* (2013.01); *H04L 65/4084* (2013.01); *H04L 65/607* (2013.01); *H04L 67/26* (2013.01); *H04L 67/42* (2013.01)

(58) Field of Classification Search
CPC ....... H04L 65/608; H04L 67/12; H04L 67/42; H04L 67/04; H04L 67/142
See application file for complete search history.

(56) References Cited

U.S. PATENT DOCUMENTS

2015/0281196 A1* 10/2015 Sharma .................. H04L 51/12
   713/151
2015/0350287 A1* 12/2015 Novo Diaz ........... H04L 65/607
   709/203

(Continued)

FOREIGN PATENT DOCUMENTS

WO    2013/127437 A1    9/2013

OTHER PUBLICATIONS

Shelby et al., "The Constrained Application Protocol (CoAP)" Internet Engineering Task Force (IETF) RFC 7252 Standards Track, Jun. 2014, 113 pages.

(Continued)

*Primary Examiner* — Oleg Survillo
(74) *Attorney, Agent, or Firm* — BakerHostetler

(57) ABSTRACT

The CoAP base protocol can be enhanced to support CoAP streaming. Streaming can use a reserved "/streaming" URI and current CoAP methods can be used towards the "/streaming" location, which will trigger or terminate streaming operations. Streaming can use a new STREAM method. Alternately, the current Observe mechanism can be (Continued)

enhanced to support streaming. Streaming operation can be combined with existing CoAP block transfer operations.

20 Claims, 28 Drawing Sheets

(56) References Cited

U.S. PATENT DOCUMENTS

| | | | | |
|---|---|---|---|---|
| 2016/0014679 | A1* | 1/2016 | Taneja | H04W 4/70 455/434 |
| 2017/0325125 | A1* | 11/2017 | Novo Diaz | H04L 29/06 |
| 2017/0373804 | A1* | 12/2017 | Han | H04W 4/70 |
| 2018/0007172 | A1* | 1/2018 | Wang | H04L 69/02 |
| 2018/0295190 | A1* | 10/2018 | Lu | H04L 67/12 |
| 2018/0302290 | A1* | 10/2018 | Rahman | H04W 4/70 |

OTHER PUBLICATIONS

Shelby et al., "CoRE Resource Directory draft-ietf-core-resource-directory-02" CoRE Internet-Draft Standards Track, Nov. 9, 2014, 35 Pages.

Shelby et al., "Contrained RESTful Environments (CoRE) Link Format" Internet Engineering Task Force (IETF) RFC 6690 Standards Track, Aug. 2012, 23 pages.

Schulzrinne et al., "RTP: A Transport Protocol for Real-Time Application" Network Working Group RFC 3550 Standards Track, Jul. 2003, 89 Pages.

Schulzrinne et al., "Real Time Streaming Protocol (RTSP)" Network Working Group RFC 2326 Standards Track, Apr. 1998, 92 pages.

Rahman et al., "Group Communication for the Constrained Application Protocol (CoAP)", Internet Engineering Task Force (IETF) RFC 7390, Oct. 2014, 47 Pages.

Pantos et al., "HTTP Live Streaming draft-pantos-http-live-streaming-13" Informational Internet-Draft, Apr. 16, 2014, 56 Pages.

Loreto et al., "CoAP Streaming: draft-loreto-core-coap-streaming-00.txt", Internet Engineering Task Force, Mar. 27, 2012, pp. 1-9.

Hartke et al., "Observing Resources in CoAP drft-ietf-core-observe-15" CoRE Working Group, Internet-Draft, Standards Track, Oct. 27, 2014 20 Pages.

Bormann et al., "Blockwise transfers in CoAP draft-ietf-core-block-16" CoRE Working Group, Internet-Draft, Standards Track, Oct. 27, 2014 34 pages.

"HTTP Live Streaming Overview" https://developer.apple.com/library/ios/documentation/networkinginternet/conceptual/streamingmediaguide/Introduction/Introduction.html, Downloaded on Dec. 13, 2018, 4 pages.

* cited by examiner

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |Ver| T |  TKL  |      Code     |          Message ID           |
 +-+-+-+-+-+-+-+-+-+-+-+-+-+-+-+-+-+-+-+-+-+-+-+-+-+-+-+-+-+-+-+-+
 |   Token (if any, TKL bytes) ...                               |
 +-+-+-+-+-+-+-+-+-+-+-+-+-+-+-+-+-+-+-+-+-+-+-+-+-+-+-+-+-+-+-+-+
 |   Options (if any) ...                                        |
 +-+-+-+-+-+-+-+-+-+-+-+-+-+-+-+-+-+-+-+-+-+-+-+-+-+-+-+-+-+-+-+-+
 |1 1 1 1 1 1 1 1|    Payload (if any) ...                       |
 +-+-+-+-+-+-+-+-+-+-+-+-+-+-+-+-+-+-+-+-+-+-+-+-+-+-+-+-+-+-+-+-+
```

FIG. 6   PRIOR ART

MECHANISMS TO SUPPORT ADAPTIVE CONSTRAINED APPLICATION PROTOCOL (COAP) STREAMING FOR INTERNET OF THINGS (IOT) SYSTEMS

CROSS-REFERENCE TO RELATED APPLICATIONS

This Application is a National Stage Application filed under 35 U.S.C. § 371 of International Application No. PCT/US2016/038987 filed Jun. 23, 2016, which claims the benefit of U.S. Provisional Patent Application Ser. No. 62/183,490, filed Jun. 23, 2015, the disclosure of which is hereby incorporated by reference as if set forth in its entirety.

BACKGROUND

Streaming media is multimedia that is received by and presented to a receiver while being delivered by a provider. There are two classes of streaming media: on-demand streaming and live streaming.

With on-demand streaming, also called video on-demand, the media has been previously recorded and likely compressed. The media files are stored at the server and delivered to one or multiple receivers when requested (on-demand). Popular sites provide streaming of stored audio and video today, including YouTube and CNN. Video on-demand allows users to select and watch/listen to video or audio content when they choose to, rather than having to watch at a specific broadcast time.

With live streaming, the media is captured, compressed and transmitted on the fly. Live streaming requires more computing resources and often specific hardware support. Live streaming also requires a form of source media (e.g. a video camera, an audio interface, screen capture software), an encoder to digitize the content, a media publisher, and a content delivery network to distribute and deliver the content.

Streaming media usually has stringent requirements on various performance metrics, for example, in terms of delay, jitter, loss, resolution, file size and network bandwidth.

The Real-time Transport Protocol (RTP), the RTP Control Protocol (RTCP) and the Real Time Streaming Protocol (RTSP) were common streaming protocols used before the Hypertext Transfer Protocol (HTTP) adaptive streaming became popular. RTP defines a standardized packet format for delivering audio and video over IP networks. RTP runs over the User Datagram Protocol (UDP). RTP is used in conjunction with the RTCP. While RTP carries the media streams (e.g., audio and video), RTCP is used to monitor transmission statistics and Quality of Service (QoS) and aids synchronization of multiple streams. RTP can carry a range of multimedia formats (such as H.264, MPEG-4, MPEG, etc.)

RTSP is a network control protocol designed for use in entertainment and communications systems to control streaming media servers. The transmission of streaming data itself is not a task of the RTSP protocol. Most RTSP servers use RTP in conjunction with RTCP for media stream delivery. However some vendors implement proprietary transport protocols.

RTSP defines control sequences useful in controlling multimedia playback. RTSP messages are Request/Response based, defining operations such as PLAY, PAUSE, SETUP, TEARDOWN, etc. RTSP is used when viewers communicate with a unicast streaming server. RTSP uses stateful session for its streaming. An RTSP session is a complete RTSP "transaction", for example, the viewing of a movie. A session typically consists of a client setting up a transport mechanism for the continuous media stream (SETUP), starting the stream with PLAY or RECORD, and closing the stream with TEARDOWN. Both the RTSP client and server maintain a state machine. Below is an example of the PLAY description in RTSP:

C→S: PLAY rtsp://example.com/media.mp4 RTSP/1.0
   CSeq: 4
   Range: npt=5-20
   Session: 12345678
S→C: RTSP/1.0 200 OK
   CSeq: 4
   Session: 12345678
   RTP-Info:
   url=rtsp://example.com/media.mp4/streamid=0;
     seq=9810092;rtptime=3450012

HTTP adaptive streaming refers to the methods to break the media file in small chunks and the client can download the chunks using the HTTP protocol. HTTP adaptive streaming can support media to be played in near real time.

There are several variations of HTTP adaptive streaming using similar approaches. Dynamic Adaptive Streaming over HTTP (DASH), also known as MPEG-DASH, is an adaptive bitrate streaming technique that enables high quality streaming of media content over the Internet delivered from conventional HTTP web servers. A similar solution is Apple's HTTP Live Streaming (HLS) solution as illustrated in more details below.

HTTP Live Streaming is a method to use HTTP to deliver streaming-like multimedia. It was implemented by Apple on their products such as QuickTime and iOS. HTTP live streaming is achieved by the following.

A multimedia presentation is specified by a URI to a Playlist file, which is an ordered list of media URIs and informational tags. The URIs and their associated tags specify a series of media segments. Each media URI in a Playlist file specifies a media segment which is part of the overall presentation.

To play the presentation, the client first obtains the Playlist file and then obtains and plays each media segment in the Playlist. Each media segment has its own URI. It reloads the Playlist file as described in this document to discover additional segments.

FIG. 1 illustrates the architecture and flow of operations for Apple's HTTP Live Streaming. There are three steps for HTTP live streaming.

An input stream is encoded/transcoded: The input 102 can be a satellite feed or any other type of input. The video and audio source is encoded (or transcoded) in encoder 104 to an MPEG-2 transport stream container, with H.264 video and Advanced Audio Coding (AAC) audio, which are the codecs Apple devices currently support.

Output profiles are created: Typically a single input stream will be transcoded to several output resolutions/bit rates, depending on the types of client devices that the stream is destined for. For example, an input stream of H.264/AAC at 7 Mbps could be transcoded to four different profiles with bit rates of 1.5 Mbps, 750K, 500K, and 200K. These would be suitable for devices and network conditions ranging from high-end to low-end, such as an iPad, iPhone 4, iPhone 3, and a low bit rate version for bad network conditions.

The streams are segmented: The streams contained within the profiles all need to be segmented in stream segmenter 106 and made available for delivery to an origin web server or directly to a client device over HTTP. The software or hardware device that does the segmenting (the segmenter) also creates an index file/Playlist which is used to keep track of the individual video/audio segments.

The client 108 downloads the index file via a URL that identifies the stream. The index file tells the client where to get the stream chunks (each with its own URL). For a given stream, the client then fetches each stream chunk in order. Once the client has enough of the stream downloaded and buffered, it displays it to the user.

Constrained Application Protocol (CoAP) is being developed by IETF CoRE Working Group [RFC 7252, The Constrained Application Protocol (CoAP)] CoAP is a web transfer protocol for use with constrained nodes and constrained (e.g., low-power, lossy) networks.

The interaction model of CoAP 206 is similar to the client/server model of HTTP. One could think of CoAP 206 logically as using a two-layer approach as shown in FIG. 2, a CoAP messaging layer 202 used to deal with UDP and the asynchronous nature of the interactions, and the request/response interactions 204 using Methods (GET, PUT, POST, DELETE) and Response codes.

CoAP 204 defines four types of messages, Confirmable (CON), Non-confirmable (NON), Acknowledgement (ACK), and Reset (RST).

A Confirmable (CON) message 302 is retransmitted using a default timeout and exponential back-off between retransmissions, until the recipient sends an Acknowledgement (ACK) message with the same Message ID. FIG. 3 shows an example of the confirmable message 302 with ACK 304 of the same message ID 0x7d34.

An Acknowledgement (ACK) 304 is used to acknowledge the Confirmable message. When a recipient is not able to process a Non-confirmable message, it may reply with a Reset message (RST).

A Non-confirmable (NON) message 402 that does not require reliable transmission, for example each single measurement out of a stream of sensor data, can be sent as a Non-confirmable message 402. These are not acknowledged, but still have a Message ID for duplicate detection. An example with message ID 0x01a0 is shown in FIG. 4.

CoAP request and response semantics are carried in CoAP messages, which include either a Method code or Response code, respectively. Optional (or default) request and response information, such as the URI and payload media type are carried as CoAP options. A Token is used to match responses to requests independently from the underlying messages.

A request is carried in a Confirmable (CON) or Non-confirmable (NON) message, and if immediately available, the response to a request carried in a Confirmable message is carried in the resulting Acknowledgement (ACK) message. This is called a piggy-backed Response, shown in FIG. 5. If a request is sent in a Non-confirmable message, then the response is sent using a new Non-confirmable message.

CoAP messages are encoded in a simple binary format, shown in FIG. 6. The message format starts with a fixed-size 4-byte header. This is followed by a variable-length Token value which can be between 0 and 8 bytes long. Following the Token value comes a sequence of zero or more CoAP Options in Type-Length-Value (TLV) format, optionally followed by a payload which takes up the rest of the datagram.

The fields in the header are defined as follows:
Version (Ver): 2-bit unsigned integer. Indicates the CoAP version number.
Type (T): 2-bit unsigned integer. Indicates if this message is of type Confirmable (0), Non-confirmable (1), Acknowledgement (2) or Reset (3).
Token Length (TKL): 4-bit unsigned integer. Indicates the length of the variable-length. Token field (0-8 bytes). Lengths 9-15 are reserved, are not sent, and are processed as a message format error.
Code: 8-bit unsigned integer, split into a 3-bit class (most significant bits) and a 5-bit detail (least significant bits), documented as c.dd where c is a digit from 0 to 7 for the 3-bit subfield and dd are two digits from 00 to 31 for the 5-bit subfield. The class can indicate a request (0), a success response (2), a client error response (4), or a server error response (5). All other class values are reserved. As a special case, Code 0.00 indicates an Empty message. In case of a request, the Code field indicates the Request Method; in case of a response it indicates a Response Code.

CoAP code registry is as follows:
0.00 Indicates an Empty message
0.01-0.31 Indicates a request. Values in this range are assigned by the "CoAP Method Codes" sub-registry
1.00-1.31 Reserved
2.00-5.31 Indicates a response. Values in this range are assigned by the "CoAP Response Codes" sub-registry
6.00-7.31 Reserved
Message ID: 16-bit unsigned integer in network byte order. Used for the detection of message duplication, and to match messages of type Acknowledgement/Reset to messages of type Confirmable/Non-confirmable.

The fields after the header in the rest of the message are defined as follows: Token: 0 to 8 bytes, as given by the Token Length field. The Token value is used to correlate requests and responses.

Options: An Option can be followed by the end of the message, by another Option, or by the Payload Marker and the payload.

CoAP defines a number of options which can be included in a message. Both requests and responses may include a list of one or more options. For example, the URI in a request is transported in several options, and metadata that would be carried in an HTTP protocol header is supplied as options as well. Each option instance in a message specifies the Option Number of the defined CoAP option, the length of the Option Value and the Option Value itself. Option value can be empty, opaque, Uint (A non-negative integer) or String.

Both requests and responses may include a list of one or more options. CoAP defines a single set of options that are used in both requests and responses.

Options fall into one of two classes: "critical" or "elective". An Option is identified by an option number, which also provides some additional semantics information: e.g., odd numbers indicate a critical option, while even numbers indicate an elective option. The difference between these is how an option unrecognized by an endpoint is handled:

Upon reception, unrecognized options of class "elective" is silently ignored.

Unrecognized options of class "critical" that occur in a Confirmable request cause the return of a 4.02 (Bad Option) response.

Unrecognized options of class "critical" that occur in a Confirmable response, or piggy-backed in an Acknowledgement, cause the response to be rejected.

Unrecognized options of class "critical" that occur in a Non-confirmable message cause the message to be rejected.

Options are also classified based on how a proxy is to deal with the option if it does not recognize it. For this purpose, an option can either be considered Unsafe to Forward (UnSafe is set) or Safe-to-Forward (UnSafe is clear). In addition, for an option that is marked Safe-to-Forward, the option number indicates whether it is intended to be part of the Cache-Key in a request or not; if some of the NoCacheKey bits are 0, it is, if all NoCacheKey bits are 1, it is not. An option that is repeatable may be included one or more times in a message.

Table 1 shows the properties of CoAP options with two examples defined in the current CoAP specification called Proxy-scheme and Size1.

TABLE 1

| | | | | | | | | |
|---|---|---|---|---|---|---|---|---|
| Properties of Options | | | | | | | | |
| No. Number | C Critical | U Unsafe | N NoCacheKey | R Repeatable | Name | Format | Length | Default |
| 39 | x | x | — | | Proxy-scheme | String | 1-255 | (none) |
| 60 | | | x | | Size1 | Uint | 0-4 | (none) |

The CoAP Options are maintained by an IANA registry. The IANA policy for future additions to this sub-registry is split into three tiers as follows. The range of 0 . . . 255 is reserved for options defined by the IETF. The range of 256 . . . 2047 is reserved for commonly used options with public specifications (Specification Required). The range of 2048 . . . 64999 is for all other options including private or vendor specific ones.

CoAP defines four methods, GET, POST, PUT and DELTE.

The GET method retrieves a representation for the information that currently corresponds to the resource identified by the request URI. Upon success, a 2.05 (Content) or 2.03 (Valid) response code should be present in the response.

The POST method requests that the representation enclosed in the request be processed. The actual function performed by the POST method is determined by the origin server and dependent on the target resource. It usually results in a new resource being created or the target resource being updated.

The PUT method requests that the resource identified by the request URI be updated or created with the enclosed representation. If a resource exists at the request URI the enclosed representation should be considered a modified version of that resource, and a 2.04 (Changed) response code should be returned. If no resource exists then the server may create a new resource with that URI, resulting in a 2.01 (Created) response code.

The DELETE method requests that the resource identified by the request URI be deleted.

The CoAP base protocol indicates that methods beyond the basic four can be added to CoAP in separate specifications. New methods do not necessarily have to use requests and responses in pairs.

CoAP core protocol is Request-Response based and does not work well when a client is interested in having the resource representation over a period of time. CoAP Observe (Observing Resources in CoAP, draft-ietf-core-observe-15) extends the CoAP core protocol with a mechanism for a CoAP client to "observe" a resource on a CoAP server.

FIG. 7 shows an example of a CoAP client 702 registering its interest in a resource at a server 704. The client can retrieve a representation of the resource and request this representation be updated by the server as long as the client is interested in the resource.

Observe is a subscribe-notification mechanism for one Request to get multiple Responses. It can be viewed as a form of session, for the purpose of notifications.

To reduce IP fragmentation, CoAP defines a pair of "Block" options, for transferring multiple blocks of information from a resource representation in multiple request-response pairs. A pair of CoAP options (called "Block1" and "Block2") has been defined to enable block-wise transfer in CoAP. In general, both Block1 and Block2 options can be present both in request and response messages. In either case, the Block1 Option pertains to the request payload, and the Block2 Option pertains to the response payload.

The Block Option defines:

The size of the block (SZX);

Whether more blocks are following (M);

The relative number of the block (NUM) within a sequence of blocks with the given size.

FIG. 8 shows an example of using the Block 2 option for the response message.

The current CoAP base protocol defines CoAP as a connection-less protocol. FIG. 9 is a high level generic call flow indicating the establishment and release of a CoAP connection in one embodiment. There are detailed mechanisms about how to enable CoAP connections that are not shown here.

This draft proposed a simple CoAP based media streaming method using the CoAP Observe mechanism. It proposed a new CoAP option "Streaming". The main purpose of this option is to indicate when a message will break into chunks of known size.

The basic cycle of an application using CoAP streaming is as follows, and shown in FIG. 10:

The client 1002 registers itself with a resource at a server 1004 by performing a GET request that includes an Observe Option.

If the observation relationship is established between the server 1004 and the client 1002, the server 1004 sends a CoAP streaming response to the client, including the Observe Option, whenever some new media chuck is available.

The server 1004 sets the value of the Observe Option in each notification to the 16 least-significant bits of a strictly increasing sequence number that contain no gap. If there is no gap in the Observe Option between two sequence notifications a client 1002 is receiving, no chunk has been lost or delayed by the network. The Option number can be viewed the same as "sequence number" of RTP and be used to reorder chunks that may arrive out of order.

A client can discover different codecs a resource (i.e. videocamera) on a server 1004 supports, using the Core Resource Discovery mechanism (RFC 6690 Constrained RESTful Environments (CoRE) Link Format). The client then chooses a proper codec to observe by selecting the right URI. FIG. 11 shows the operations for a client 1002 to discover supported codecs by the server.

In many M2M scenarios, direct discovery of resources is not practical due to sleeping nodes, disperse networks, etc. These problems can be solved by employing an entity called a Resource Directory (RD) 1202, which hosts descriptions of resources held on other servers, allowing lookups to be performed for those resources. The CoRE Resource Directory draft (CoRE Resource Directory (draft-ietf-core-resource-directory-02)) specifies the web interfaces that a Resource Directory supports in order for web servers to discover the RD 1202 and to register, maintain, lookup and remove resource descriptions. End Points (EP) 1204 are assumed to proactively register and maintain resource directory entries on the RD 1202. RD 1202 supports RESTful web interfaces for Clients 1210 to look up and discover resources.

Discovery is performed by sending either a multicast or unicast GET request to "/.well-known/core" and including a Resource Type (rt) parameter with the value "core.rd" in the query string.

After discovering the location of an RD Function Set, an endpoint may register its resources using the registration interface. The registration request interface is specified as follows:

Interaction: EP→RD
Method: POST
URI Template: /{+rd} {?ep,d,et,lt,con}
rd:=RD Function Set path (mandatory). This is the path of the RD Function Set, as obtained from discovery.
ep:=Endpoint (mandatory). The endpoint identifier or name of the registering node, unique within that domain. d:=Domain (optional). The domain to which this endpoint belongs.
et:=Endpoint Type (optional). The semantic type of the endpoint.
lt:=Lifetime (optional). Lifetime of the registration in seconds.
con:=Context (optional). This parameter sets the scheme, address and port at which this server is available in the form scheme://host:port.
Content-Type: application/link-format

SUMMARY

To enable a constrained device with streaming, the constrained protocol can be given the streaming capability, so the constrained device can support it, and does not need to support another streaming protocol.

CoAP is a protocol developed specifically for constrained devices typical of IoT sensors and gateways. Procedures are described that enable streaming content through constrained devices beyond the limited and insufficient methods defined in CoAP Streaming (draft-loreto-core-coap-streaming-00), Mar. 27, 2012.

Detailed mechanisms enhance the CoAP base protocol to support CoAP streaming. The mechanisms can include:
 Enable streaming using a reserved "/streaming" URI. In this mechanism, current CoAP methods can be used towards the "/streaming" location, which will trigger or terminate streaming operations
 Enable streaming using a new STREAM method
 Enhance the current Observe mechanism to support streaming
 Combine streaming operation with existing CoAP block transfer A list of streaming options to be used to define and configure streaming operations. These options can be used in combination to enable adaptive streaming.

Examples are given that illustrate how CoAP streaming mechanisms described above can support CoAP adaptive streaming. The following focuses on the impacts to the CoAP protocol to support streaming operations. It does not repeat commonly known methods for streaming such that the server has video files in chunks. On demand streaming and live streaming are discussed together and not differentiated. The mechanisms can apply to both. Video and audio streaming are discussed together.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 6 is a diagram illustrating a CoAP Message Format.

DETAILED DESCRIPTION OF ILLUSTRATIVE EMBODIMENTS

Figure 13:
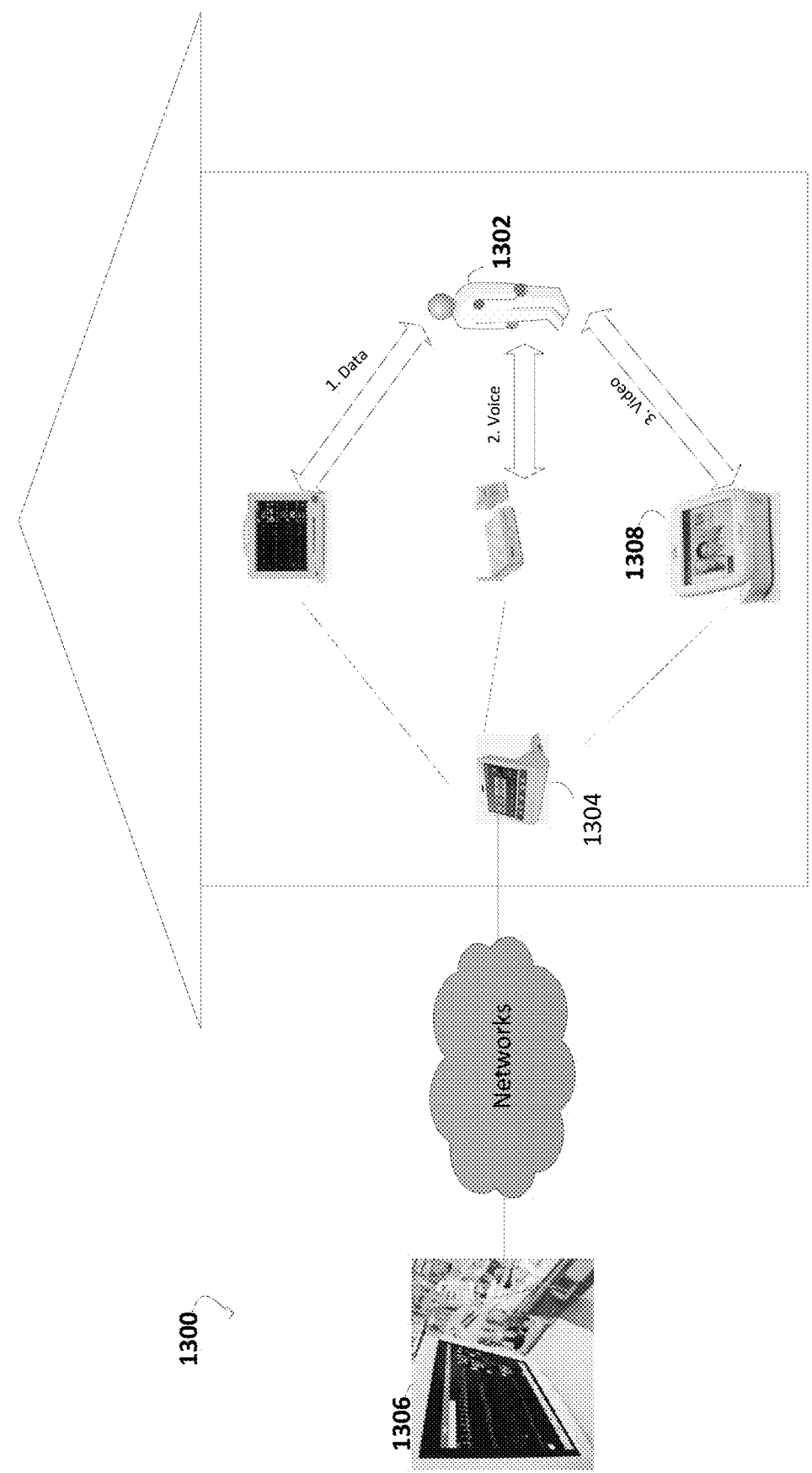
FIG. 13 is a diagram illustrating eHealth Home Monitoring System.

FIG. 13 shows an eHealth home monitoring system 1300. A patient has multiple sensors 1302 on his body. Some sensors 1302 send data readings, for example, the patient's heart beat and body temperature. The system 1300 supports a voice system that the remote health care workers can use to interact with the patient. The system 1300 has a video monitoring function 1308. The function 1308 can be triggered by different ways, such as by the remote health care worker, by a timer, or by abnormal data from the sensors. All the equipment connects to an eHealth gateway 1304 at home, and the gateway 1304 connects to the health care system 1306 in a hospital. In this use case example, the devices used in the home monitoring system 1300 vary a lot in their capacities, from very constrained device used for sensor data, to devices supporting voice and video functions. If only sensor data is transported, CoAP can be used for constrained devices. However, to support voice and video in addition to data, the home monitoring system 1300 needs to support another media protocol at the eHealth gateway 1304. If the devices for voice and video run another protocol rather than CoAP, these devices cannot interoperate with constrained devices running CoAP within the same home monitoring system, unless they communicate via the eHealth gateway 1304. The gateway 1304 would need to translate between different devices in this small deployment. This would increase the complexities for devices, in particular the eHealth gateway 1304.

It is understood that the functionality illustrated in FIG. 13, may be implemented in the form of software (i.e., computer-executable instructions) stored in a memory of, and executing on a processor of, an apparatus of an M2M network (e.g., a server, gateway, device, or other computer system), such as one of those illustrated in FIG. 26C or 26D described below.

Traditionally, streaming is largely used for entertainment and involves human interactions. There were limited IoT streaming use cases, and they usually used proprietary protocols, such as video surveillance.

Figure 14:
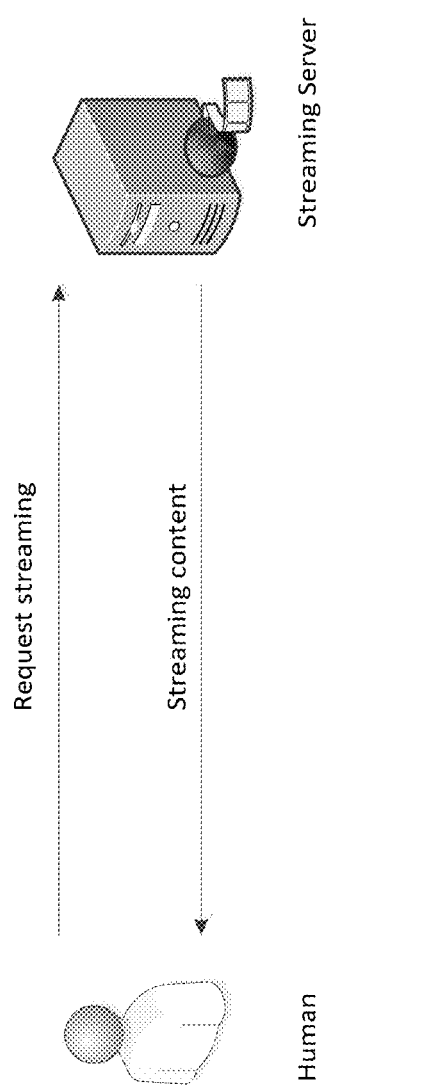
FIG. 14 is a diagram illustrating non-IoT Streaming.
Figure 15:
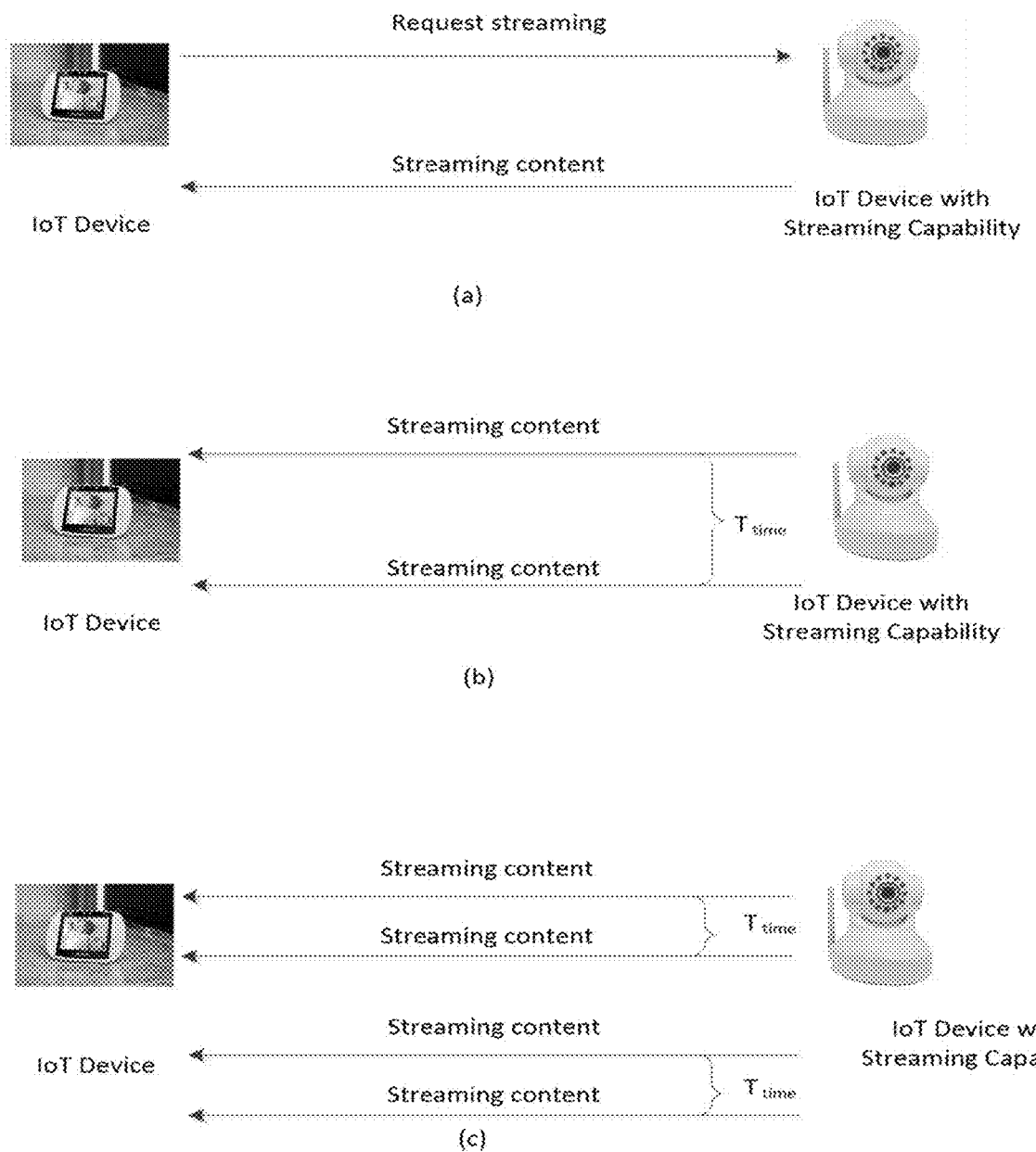
FIG. 15 is a diagram illustrating IoT Streaming.

The characteristics of non-IoT streaming are very different from IoT streaming as shown in FIG. 14 and FIG. 15 respectively. Non-IoT streaming shown in FIG. 14 is usually triggered by a person, when the person performs certain actions on a device or on a website, and the streaming can last long. For IoT streaming, it might be triggered by an IoT device as shown in FIG. 15 (case a). Or it might be pushed from the media source for a period of time (case b). It may be automated for many streaming sessions, and each lasts certain period of time (case c). The streaming duration can vary from very long to very short, depending on how the streaming is used.

Figure 26A:
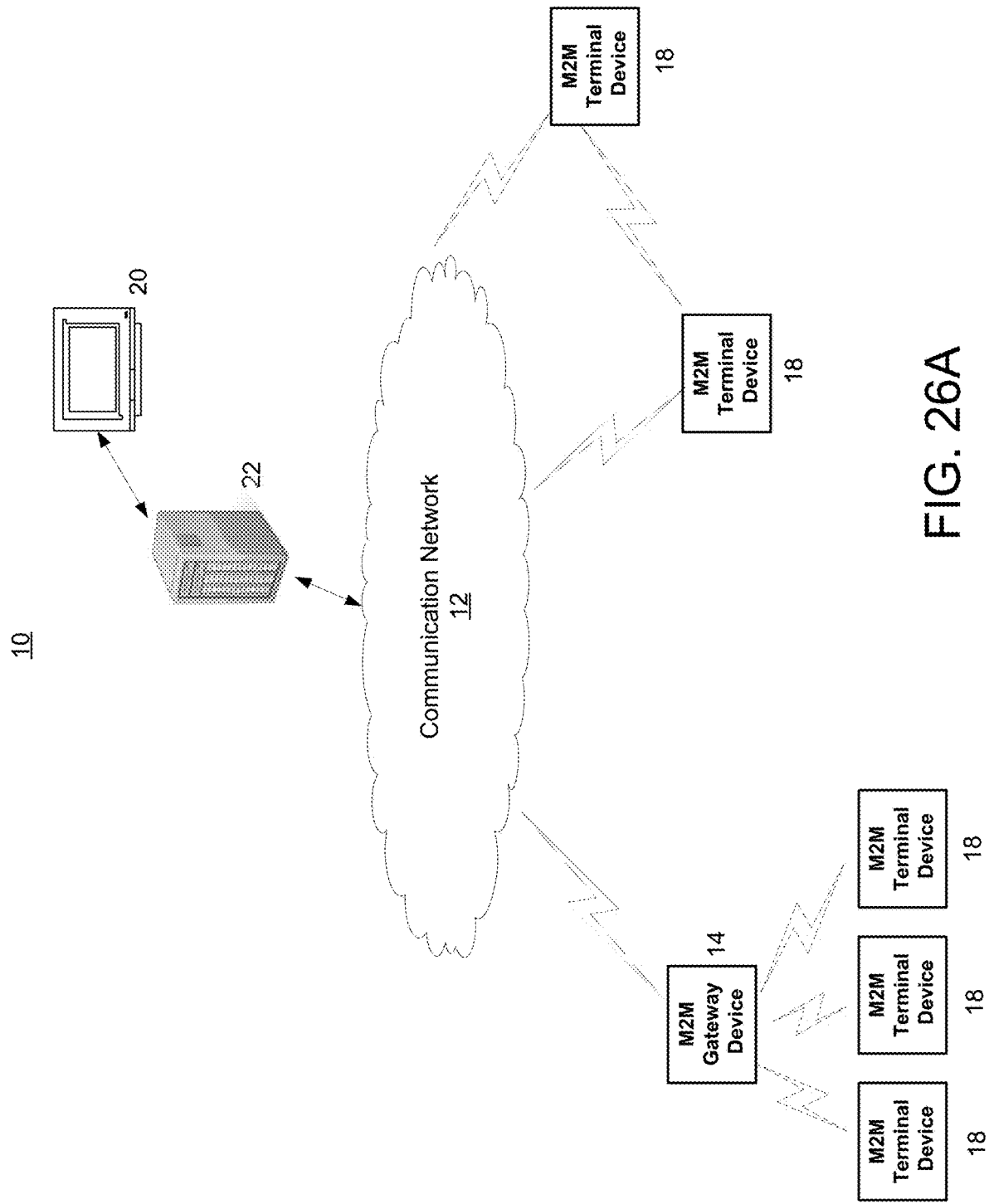
FIG. 26A is a diagram of an example machine-to machine (M2M) or Internet of Things (IoT) communication system in which one or more disclosed embodiments of IoT event management systems and methods may be implemented.
Figure 26B:
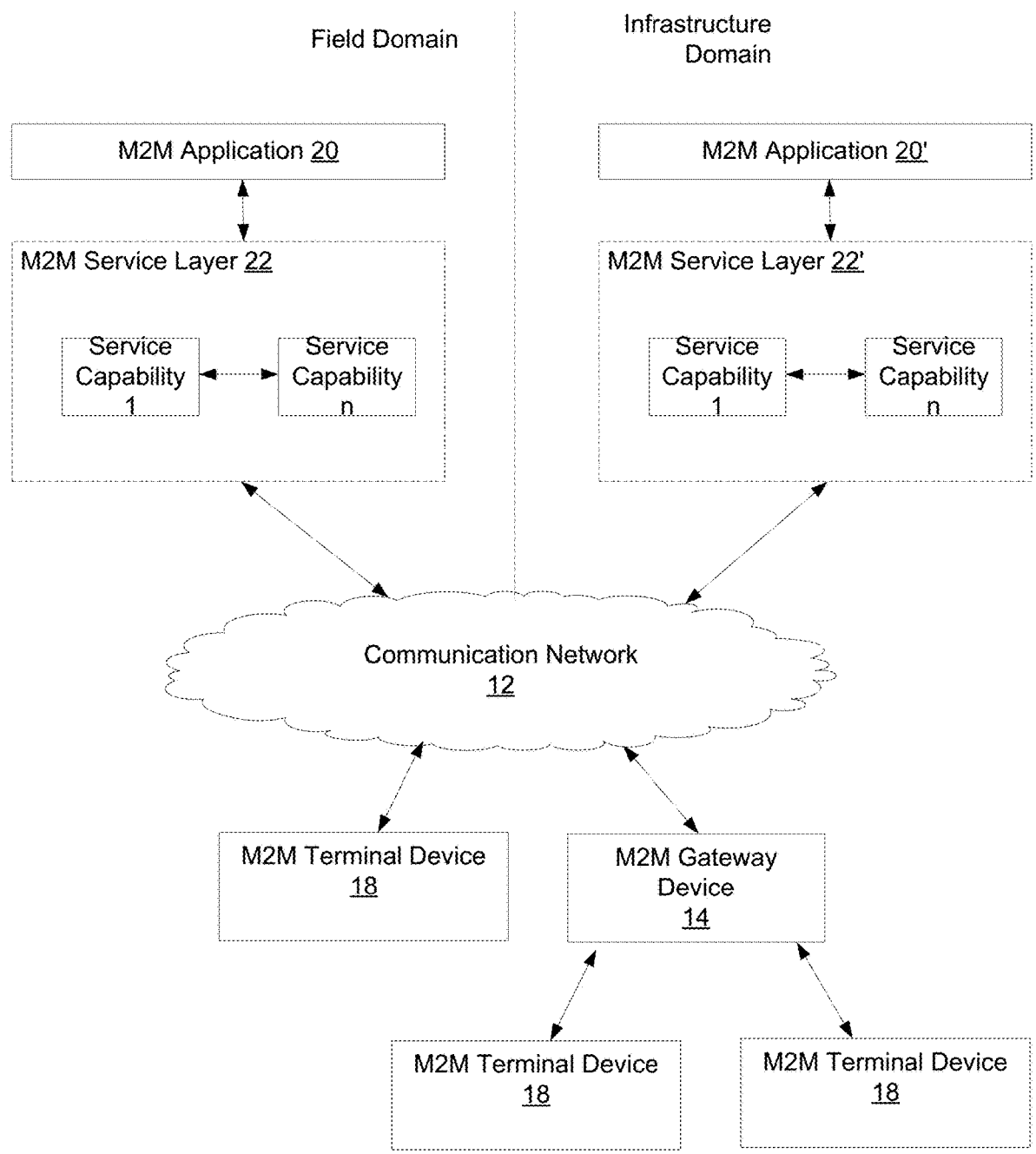
FIG. 26B is a system diagram of an example architecture that may be used within the M2M/IoT communications system illustrated in FIG. 26A.
Figure 26C:
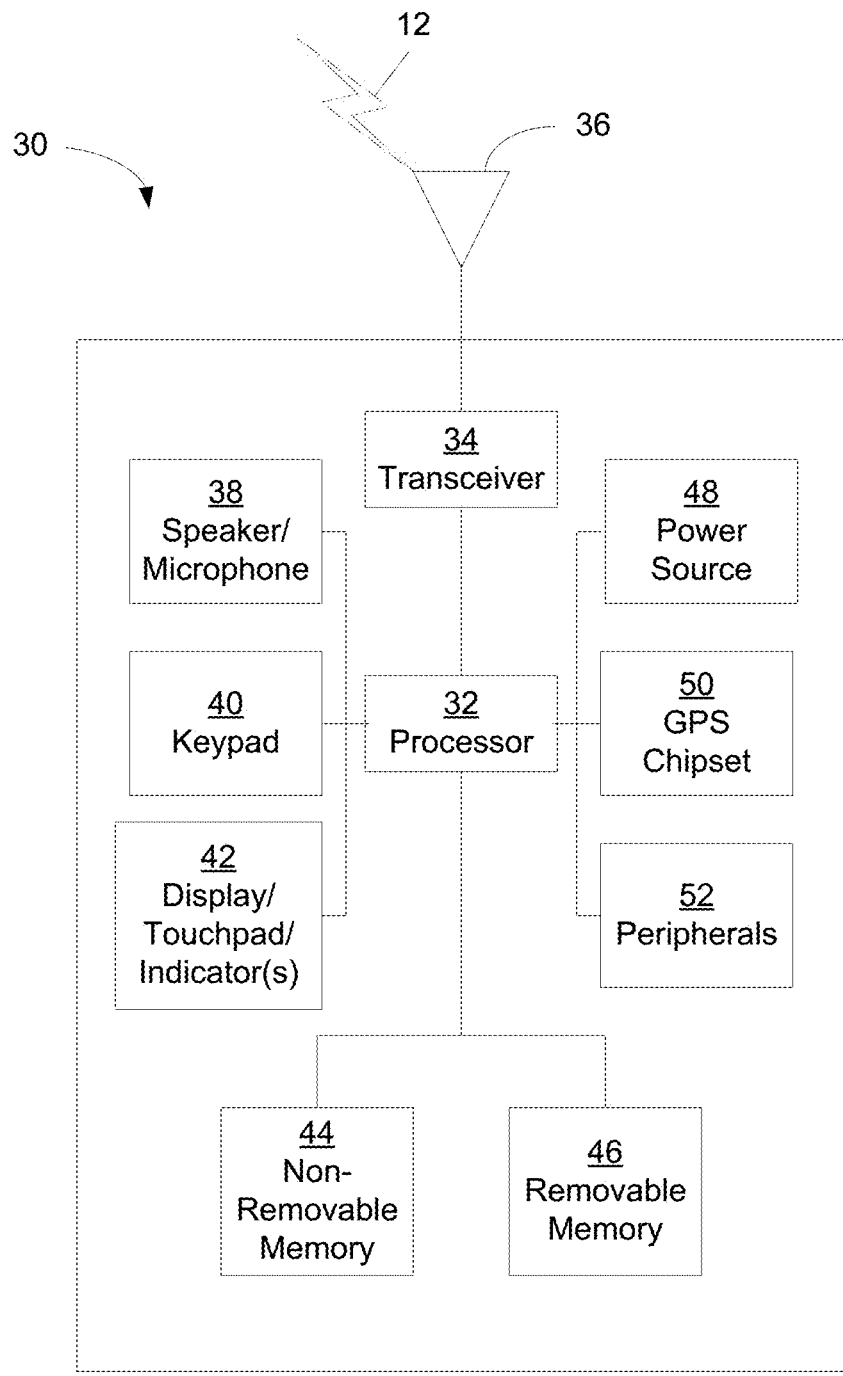
FIG. 26C is a system diagram of an example M2M/IoT terminal or gateway device that may be used within the communications system illustrated in FIG. 26A.
Figure 26D:
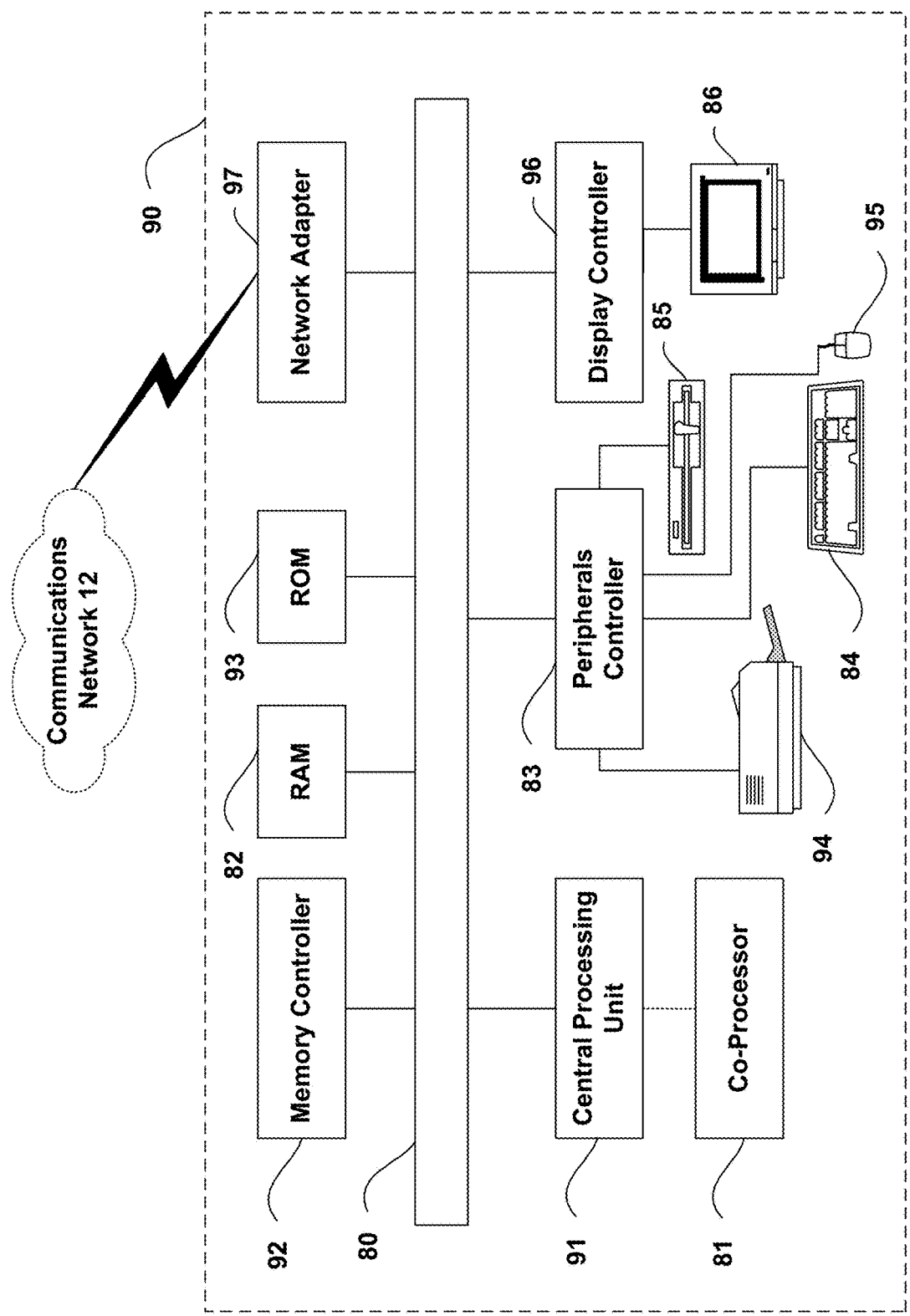
FIG. 26D is a block diagram of an example computing system in which aspects of the communication system of FIG. 26A may be embodied.

It is understood that the entities performing the steps illustrated in FIGS. 14-15 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIGS. 14-15 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIGS. 14-15. It is also understood that any transmitting and receiving steps illustrated in FIGS. 14-15 may be performed by communication circuitry of the apparatus under control of the processor of the apparatus and the computer-executable instructions (e.g., software) that it executes.

M2M/IoT deployments require light weight protocols to be used due to the constrained nature of IoT devices. CoAP is developed for IoT devices and the currently CoAP Streaming Internet Draft, does not have well developed mechanisms to effectively support streaming.

As illustrated in the use case above, it is common that in the IoT deployment there will be mixed types of media types and mixed devices (constrained and not constrained). If the IoT devices for streaming are not constrained, they may be able to support existing streaming protocols such as RTP/RTCP or HTTP. However, this means that there could be multiple protocols, such as HTTP and CoAP, even in a small scale deployment. It can largely increase the complexity of a system and limits the deployment options. For example, in the use case above, the eHealth home gateway may be a constrained device itself and not suitable to support multiple protocols or translate between different protocols.

Therefore it is desirable to have a light weight IoT protocol to support streaming and CoAP is a good candidate.

Since CoAP is specifically designed for IoT devices, it will be largely adopted for M2M communication. In particular, the current existing functions defined in the CoAP base protocol, and additional CoAP features like CoAP block transfer, can be a good basis to be leveraged and enhanced for supporting CoAP steaming. Such moderate modifications on existing CoAP functions can avoid significant development or re-deployment costs.

The current CoAP streaming proposal based on Observe is very preliminary and does not provide all functions needed and resolve issues using Observe.

Observe is basically a Subscribe-Notify mechanisms, not designed sufficiently for streaming, e.g. it does not support the basic operations for streaming, such as Play, Pause.

Figure 1:
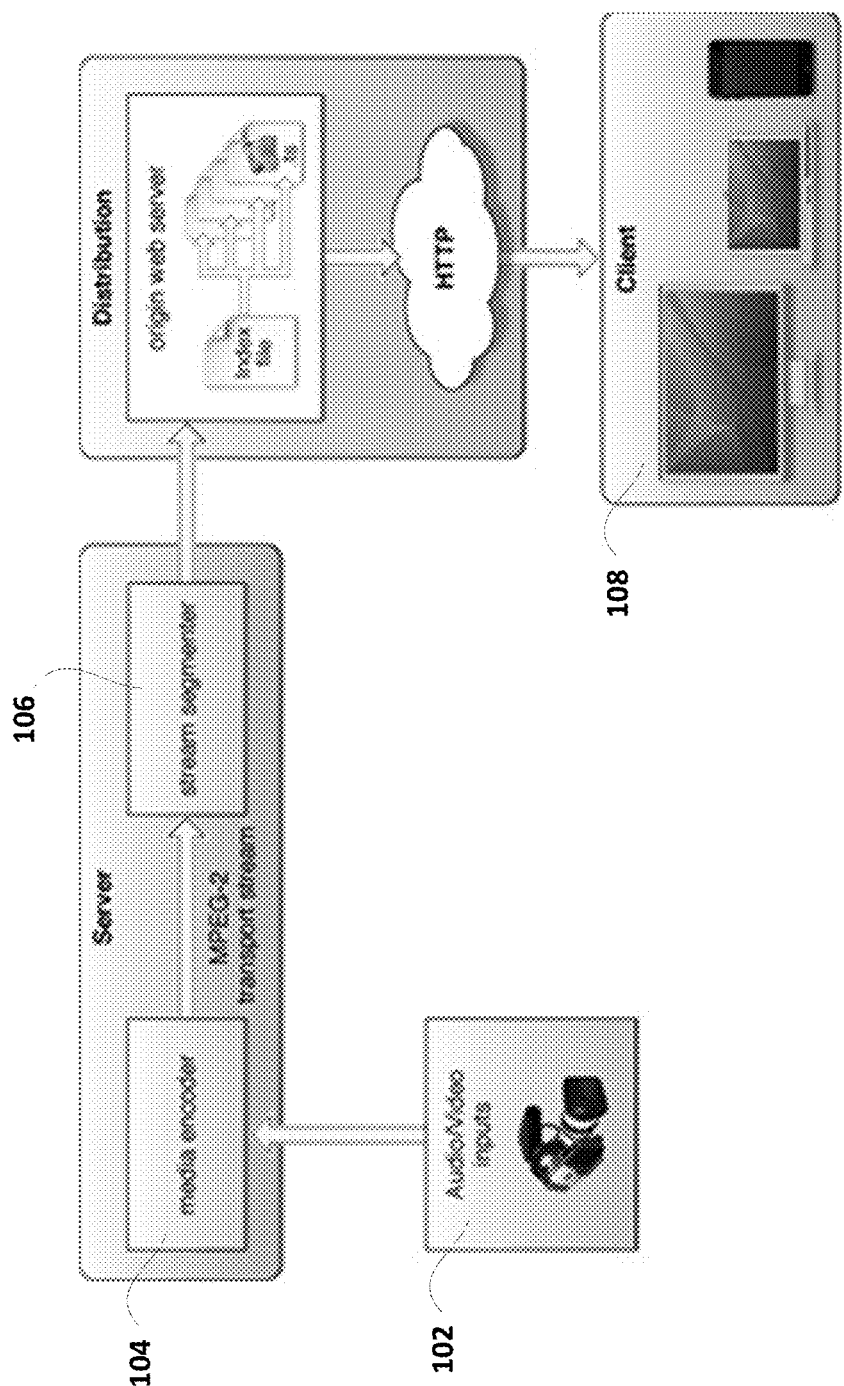
FIG. 1 is a diagram illustrating HTTP Live Streaming (HLS).
Figure 2:
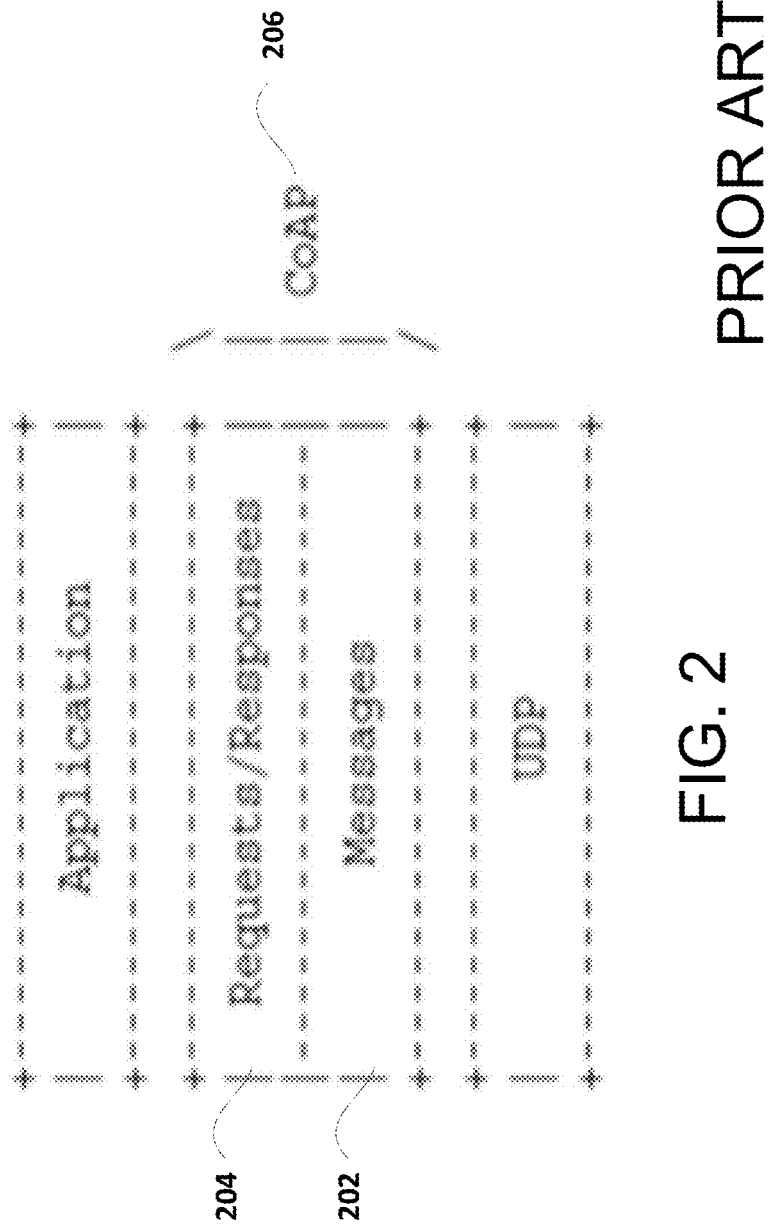
FIG. 2 is a diagram illustrating the Abstract Layering of CoAP.
Figure 3:
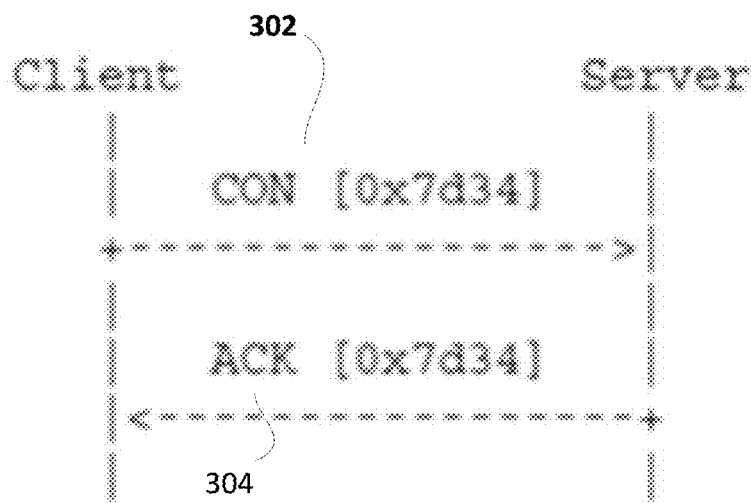
FIG. 3 is a diagram illustrating a CoAP Confirmable Message.
Figure 4:
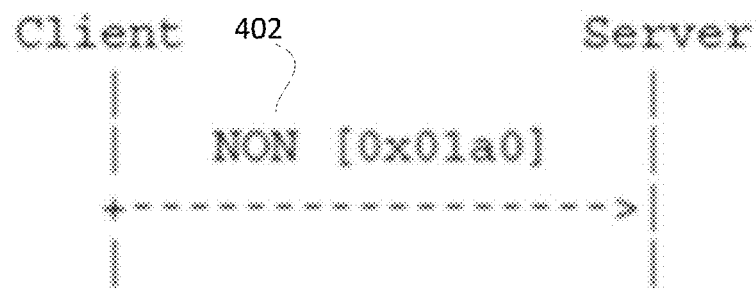
FIG. 4 is a diagram illustrating a CoAP Non-Confirmable Message.
Figure 5:
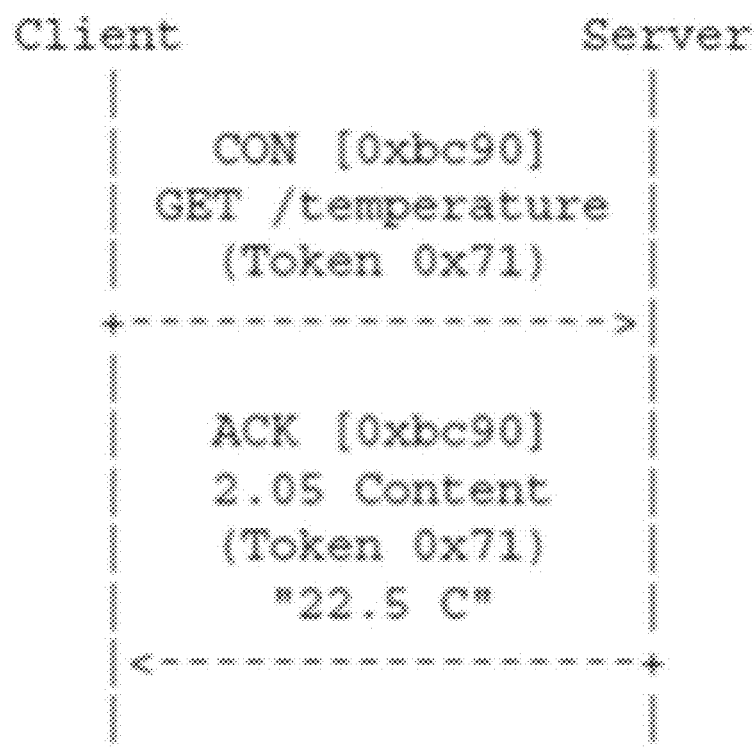
FIG. 5 is a diagram illustrating a CoAP Request/Response.
Figure 7:
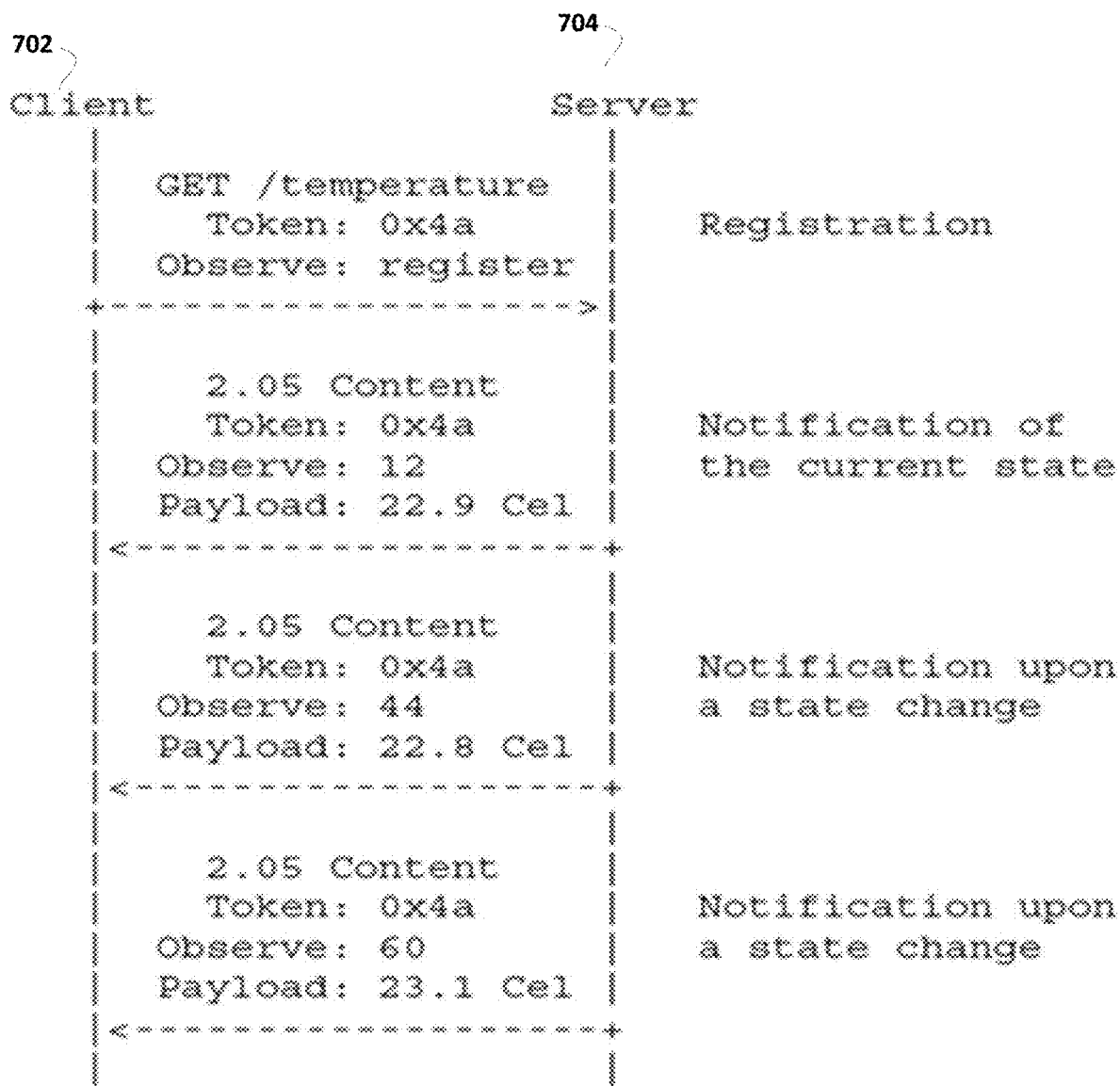
FIG. 7 is a diagram illustrating CoAP Observe.
Figure 8:
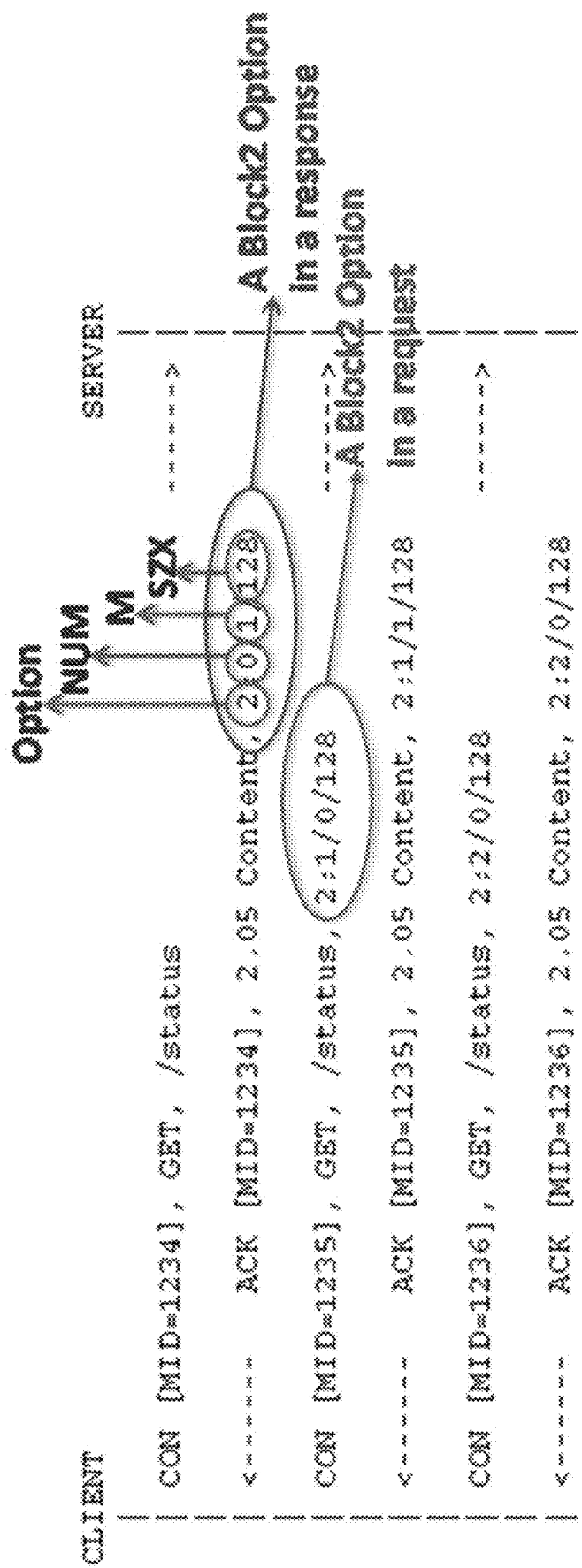
FIG. 8 is a diagram of an example of Block 2 Transfer.
Figure 9:
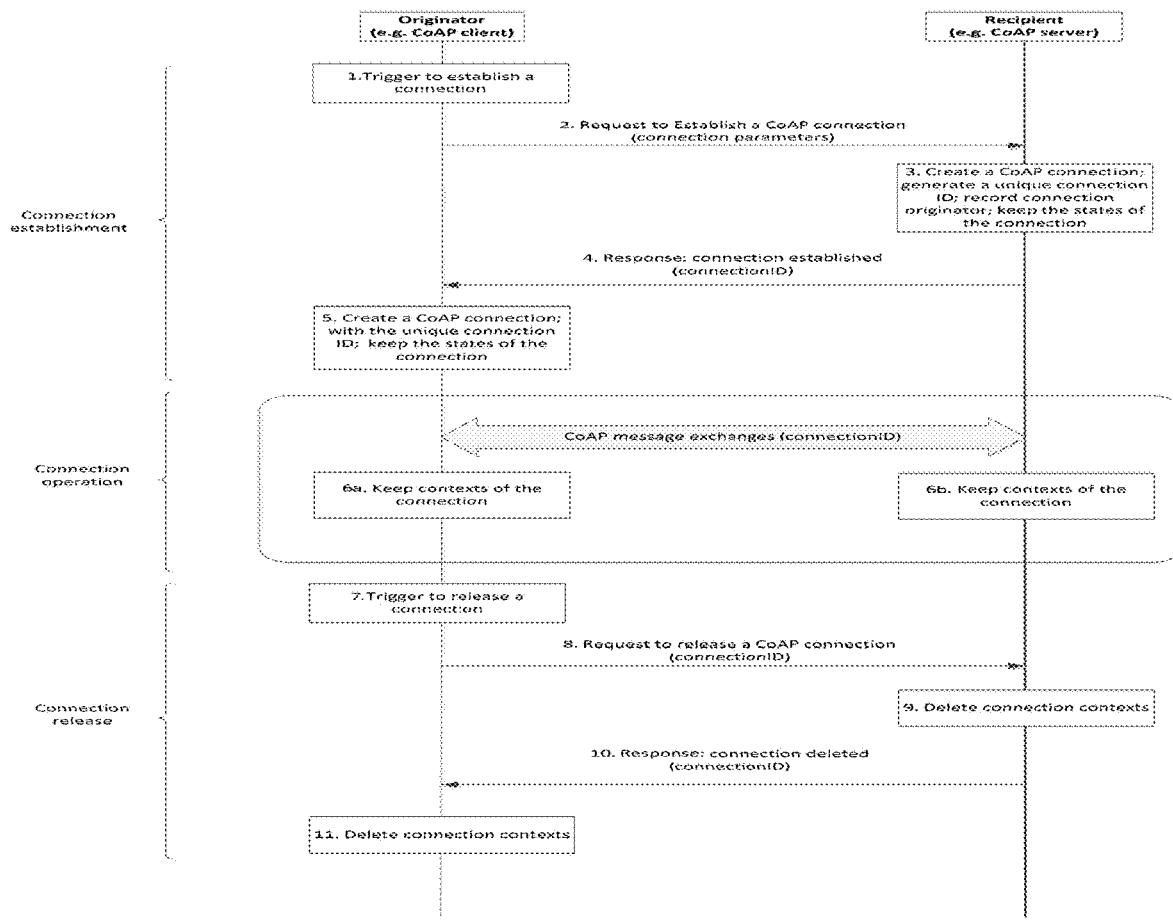
FIG. 9 is a diagram illustrating a generic CoAP Connection Call Flow.
Figure 10:
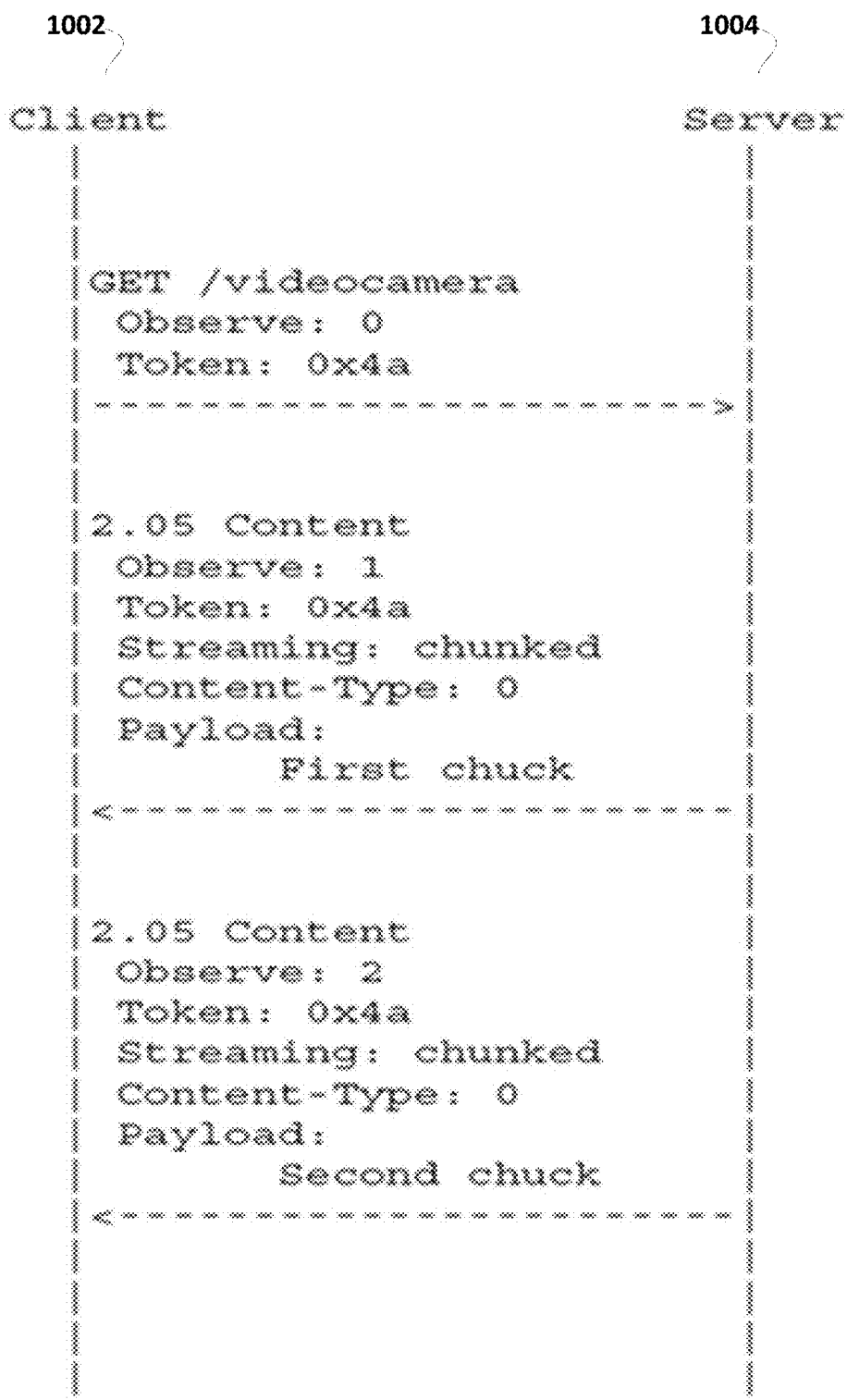
FIG. 10 is a diagram illustrating a CoAP Streaming using Observe.
Figure 11:
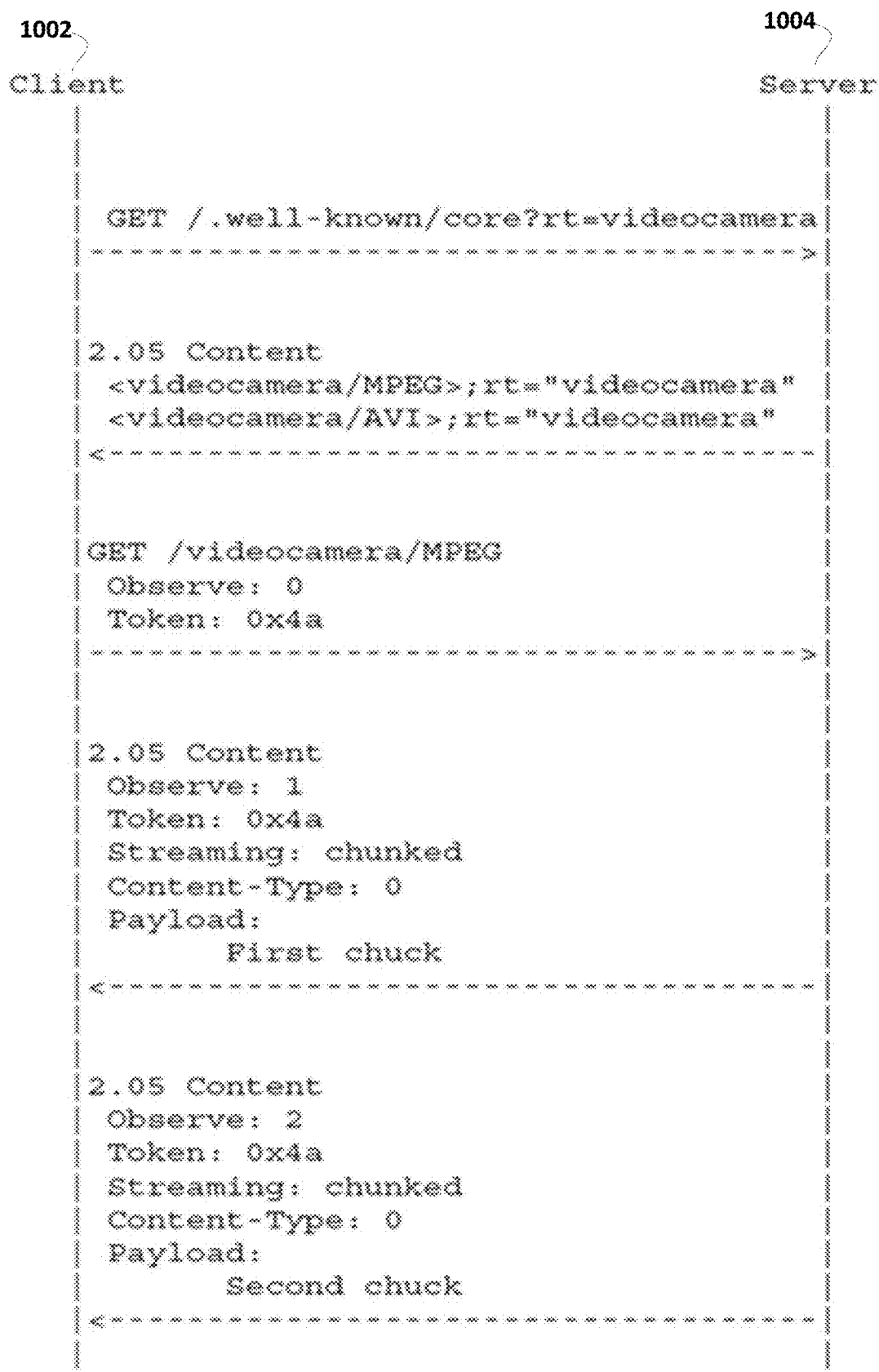
FIG. 11 is a diagram illustrating a Media Type Discovery in CoAP.
Figure 12:
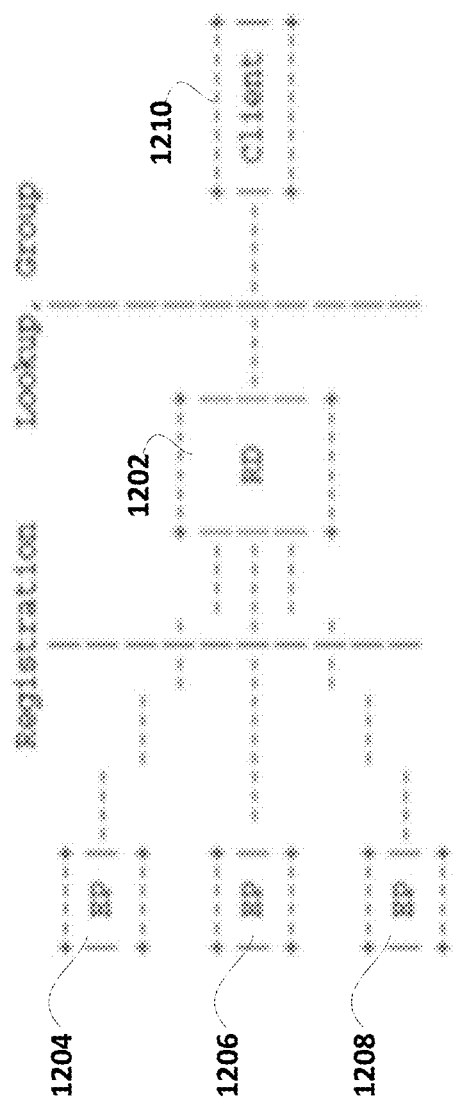
FIG. 12 is a diagram illustrating the Resource Directory Architecture.

Observe follows a best-effort approach for sending the current representation to the client after a state change (see FIG. 7) so it cannot support the stringent QoS requirements for streaming A CoAP server is the authority for determining under what conditions resources change their state and thus when observers are notified of new resource states. A CoAP server may chose not to send notifications at all. Therefore, the Observer (the CoAP client), cannot fully determine what it can get.

CoAP Observe needs to be modified to support streaming function effectively.

The following sections discuss new mechanisms for the CoAP protocol to support streaming. Since CoAP is designed mainly for IoT deployments, the mechanisms are meant to be light-weight to minimize the overhead.

CoAP is designed as a light weight protocol for IoT devices. The principle goal of CoAP streaming should also be light weight so the streaming operation does not add unnecessary overhead. To increase the flexibility and capability of CoAP, it should support discoverable configurations from very simple streaming mechanisms to more complicated streaming mechanisms. Table 2 shows the summary of mechanisms discussed in this paper. One or more of the mechanisms can be supported by a CoAP endpoint. However, the mechanisms can be all supported and used together for streaming operations. Each mechanism is described below IoT streaming options to support different streaming operations.

Note that since many IoT devices support single functionality (i.e. there is only a single source of media), the mechanisms support streaming from a default source, and the requestor of the streaming does not always have to choose the streaming source. It is preferred that CoAP non-confirmable messages are used for streaming. This can reduce the number of messages and keep the streaming operation lightweight. CoAP streaming does not mandate the use of CoAP connection since streaming can be achieved without any state information, however it can work together with CoAP connection (see the use case illustrated by FIG. 21).

tory-02). The POST request provides its end point name as "camera1". In the payload, the POST request specifies that the content type (ct) is application/XML type, the resource type (rt) is "StreamingOptions".

Request has two new link attributes to support CoAP streaming options, one is called StreamingType with "STREAMMethod" as the supported streaming type, and one is StreamingMediaType with "mpeg" as the supported streaming media type. The interface (if) is defined as "StreamingServer". More streaming options can be included using the same method.

Figure 16:
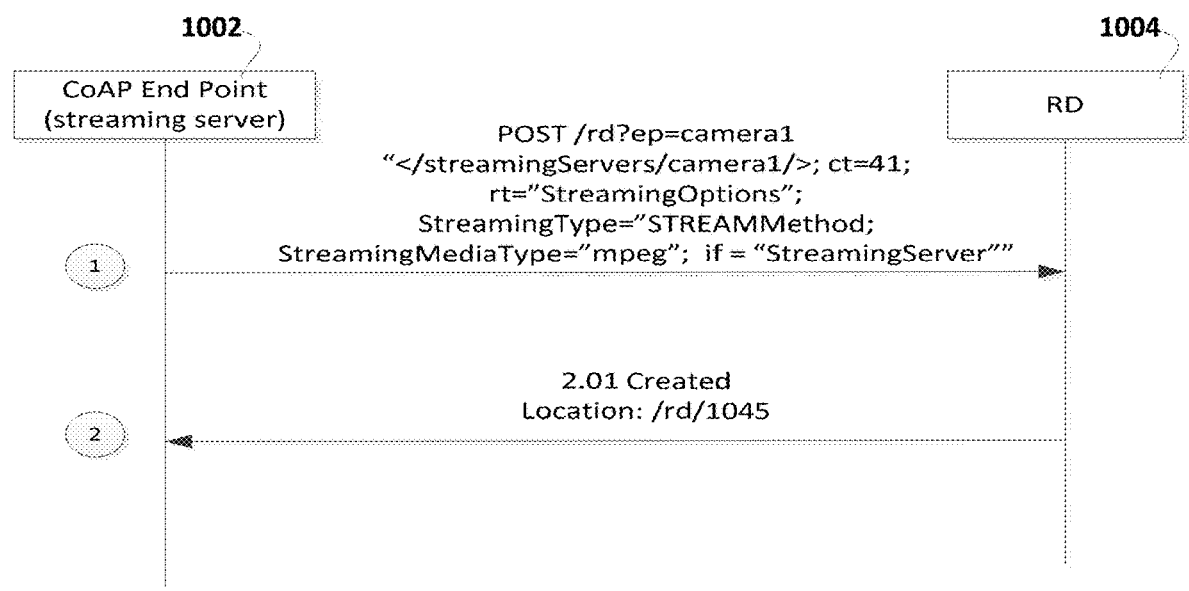
FIG. 16 is a diagram illustrating the use of a RD for Streaming Capability Discovery.

In Step 2 of FIG. 16, the resulting location/rd/1045 is just an example of an RD generated location. A client as defined in the RD draft (CoRE Resource Directory (draft-ietf-core-resource-directory-02)) can retrieve streaming options from RD.

It is understood that the entities performing the steps illustrated in FIG. 16 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 16 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 16. It is also understood that any trans-

TABLE 2

Summary of CoAP Streaming Mechanisms

| CoAP Streaming Mechanisms | Descriptions | Discovery |
| --- | --- | --- |
| using "/streaming" URI (see 5.1.1 for details) | This is a mechanism re-using the current CoAP base protocol for CoAP streaming. The client can trigger the streaming operation by directly operating on the reserved "/streaming" URI, not on any specific media resources. The client may stop the streaming explicitly or indicate a timer of the duration. An example use case that is suitable for this mechanism is that the client triggers a video camera to start streaming for a certain period of time. The client can also indicate the interval and size of the video chunks. | The client needs to discover that the server supports this operation, and the media types the server supports. |
| Using STREAM method (see 5.1.2 for details) | This is a mechanism dedicated for CoAP streaming by introducing a new STREAM method. | The client needs to discover that the server supports this operation, and the media types the server supports. |
| using CoAP Observe (see 5.1.3 for details) | This mechanism uses the CoAP Observe mechanism so the client observes a specific media resource. | The client needs to discover that the server has observable media resources that the client can Observe. |

Discovery between the CoAP client and server can be achieved by the exchange of streaming options between a CoAP client and a CoAP server. CoAP Resource Directory (RD) 1202 may also be used for discovery. FIG. 16 shows an example how RD 1202 can be used for a CoAP streaming server (CoAP End Point 1602) to register its streaming related configurations as resources in RD 1202 to be discovered by CoAP clients. In this example a CoAP endpoint 1602 which is also a streaming server has a name "camera1". It registers its supported streaming options as resources at RD 1202, using the RD registration interface.

Step 1 of FIG. 16, the CoAP End Point sends the POST request to RD, using the RD registration interface specified in CoRE Resource Directory (draft-ietf-core-resource-direcmitting and receiving steps illustrated in FIG. 16 may be performed by communication circuitry of the apparatus under control of the processor of the apparatus and the computer-executable instructions (e.g., software) that it executes.

Figure 17:
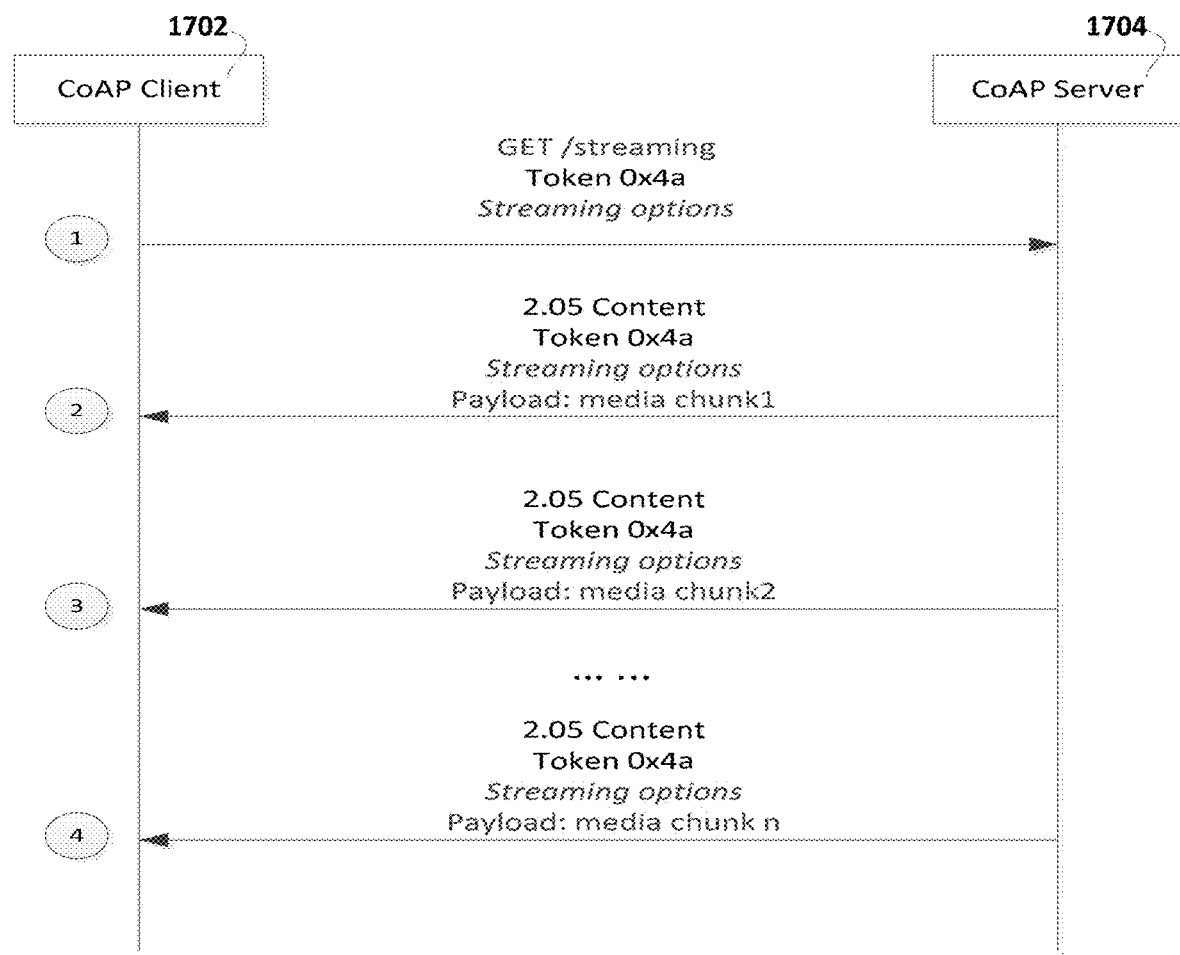
FIG. 17 is a diagram illustrating CoAP Streaming using/streaming URI (Request-Response).

FIG. 17 illustrates the mechanism of CoAP streaming using the reserved "/streaming" URI. In FIG. 17, it is assumed that the CoAP client already discovered that the CoAP server has streaming capability.

In Step 1 of FIG. 17, the CoAP client 1702 triggers the streaming operation by performing a GET operation to the reserved "/streaming" URI. Optionally, the client may also include one or multiple options to define the parameters of the streaming. For example, the client may indicate the "StreamingMediaType" it supports. Or the client may indicate the duration of the streaming so the streaming session will be automatically ended. The details of streaming options are defined below.

There can be various ways for a CoAP client 1702 to address the streaming URI. Note that in the following methods, "streaming", "video" and "audio" are used as reserved terms. The use of these terms results in the streaming operation.

/streaming: This is the common use for simple streaming cases, and the server will be streaming from its own media resource. The client does not need to have the knowledge of the media resource that the server has.

/streaming/video: This directory can be reserved for video streaming. The server streams from its video media resource. The client does not need to know where the media resource is stored on the server.

/streaming/audio: This directory can be reserved for audio streaming. The server streams from its audio media resource. The client does not need to know where the media resource is stored on the server.

/streaming/myownvideo/videofile: This mechanism does not exclude that the client operates on a specific media resource. Note that the path of the video file in this example is a combination of the reserved URI and the file's location. The file is located under /myownvideo/vidoefile on the server, and "/streaming" is not a real directory.

In Step 2 of FIG. 17, since the GET operation is on the reserved "/streaming" URI, the CoAP server 1704 knows to interpret the operation as triggering streaming. The CoAP server 1704 provides the streaming contents in the format of small file chunks. The server 1704 may exchange streaming options with the client 1702 by including streaming options to let the client 1702 know about the current streaming capabilities and preferences of the server. By exchanging streaming options, the client and server 1704 can adapt the streaming operations. For example, the server may indicate the total size of the video file that the server has. By knowing that, the client 1702 can change its video options, for example, to limit the total size of the chunks it wants to receive.

In Step 3-Step 4 of FIG. 17, the streaming operation will continue until either the specified time has expired, or the CoAP server 1704 has finished sending all the chunks. The Requests and Responses are mapped using the same Token.

The CoAP client 1702 can explicitly stop the streaming operation by sending a DELETE/streaming Request to the server 1704. The CoAP client 1702 can also use the "StopMode" to stop a streaming operation.

It is understood that the entities performing the steps illustrated in FIG. 17 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 17 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 17. It is also understood that any transmitting and receiving steps illustrated in FIG. 17 may be performed by communication circuitry of the apparatus under control of the processor of the apparatus and the computer-executable instructions (e.g., software) that it executes.

Figure 18:
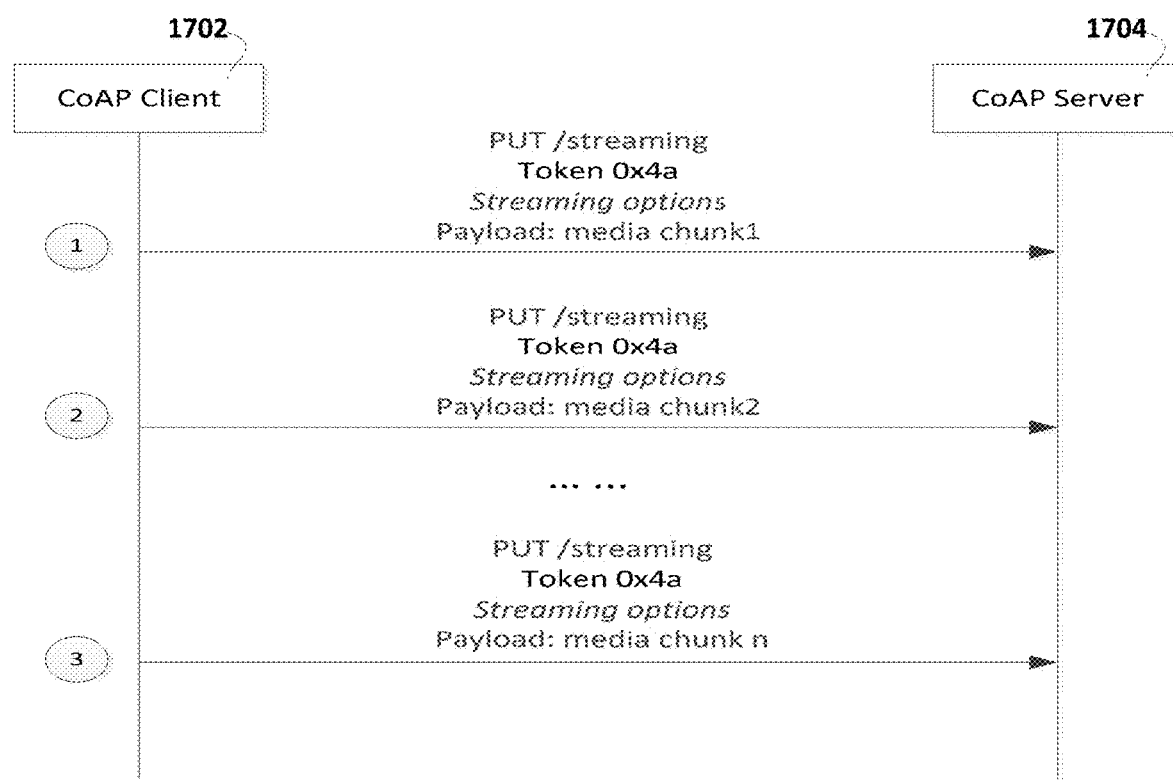
FIG. 18 is a diagram illustrating CoAP Streaming using/streaming Location (Push).

FIG. 18 shows the push operation using the /streaming URI. The figure shows the case using CoAP Non-confirmable message model so no ACK is sent for each of the request messages. If reliability is a key factor, CoAP confirmable message can be used. The figure shows using PUT for the push of contents. POST might be used as well.

In Step 2-Step 3 of FIG. 18, since the PUT operation is on the reserved "/streaming" location, the CoAP server knows to interpret the operation as pushing stream media. The CoAP server 1704 will treat this PUT operation differently from other non-streaming related PUT operations. If the client did not include any specific URI, the server will process the chunks based on its own logic, for example, displaying it using an application. The server 1704 may or may not choose to store it in its own location. If the server stores the contents locally, such contents can also be retrieved by another CoAP client using the call flow shown in FIG. 17. The server may not compose and send a Response message.

The streaming operation will continue until either the specified time expired, or the CoAP client 1702 sends all the chunks. The CoAP client 1702 can also explicitly stop the streaming operation by sending a DELETE/streaming Request to the server. If at any time the server 1704 decides that it would not like to receive the streaming content anymore, for example, due to the limit of storage or processing capacity at the server side, the server 1704 can send a Response message and include the "PauseMode" or "StopMode" option to pause or stop the streaming operation.

It is understood that the entities performing the steps illustrated in FIG. 18 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 18 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 18. It is also understood that any transmitting and receiving steps illustrated in FIG. 18 may be performed by communication circuitry of the apparatus under control of the processor of the apparatus and the computer-executable instructions (e.g., software) that it executes.

The CoAP base protocol indicates that "Methods beyond the basic four can be added to CoAP in separate specifications. New methods do not necessarily have to use requests and responses in pairs."

Streaming is a very different type of operation comparing to data exchanges using CoAP. Therefore a new STREAM method can support this specific operation.

The STREAM method triggers the streaming operation. If no payload is included, it is a Request to trigger the streaming operation at the CoAP server. Optionally the CoAP client can include a URI pointing to the media resource requested. If no URI is included, the CoAP server uses its default media resource. The CoAP server should start streaming upon receiving the request. This scenario is illustrated in FIG. 19.

Figure 20:
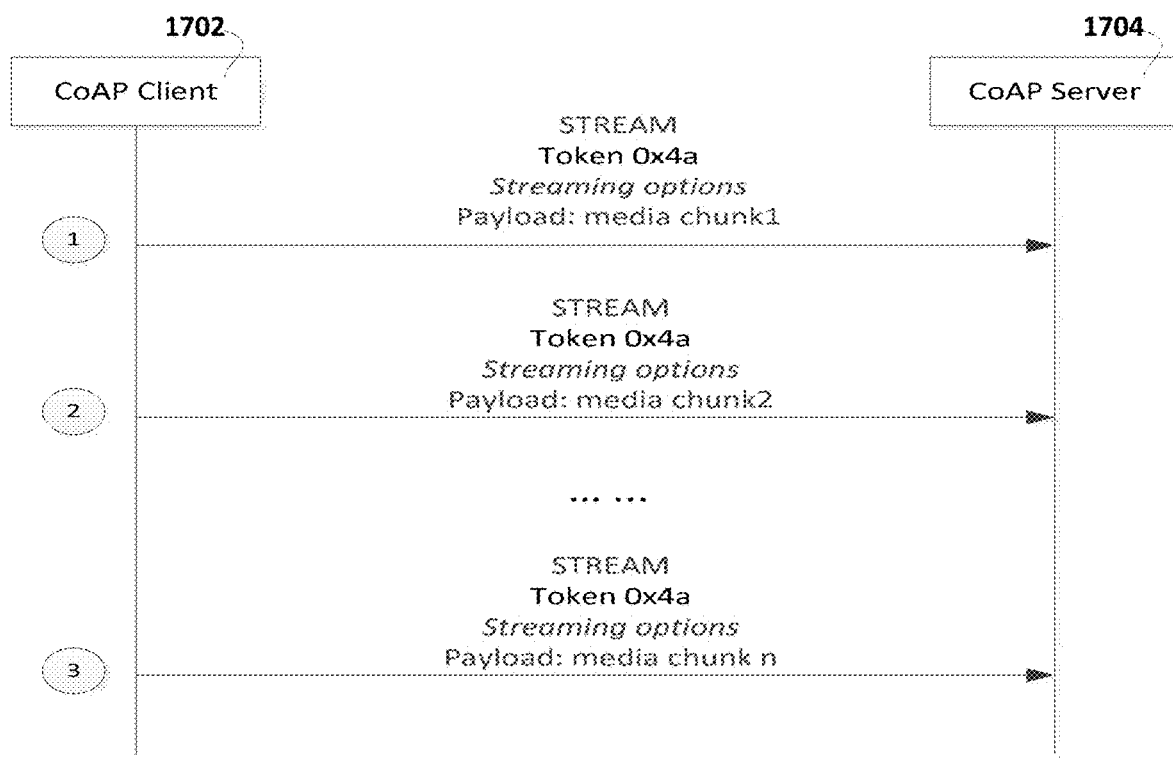
FIG. 20 is a diagram illustrating using STREAM Method (Push).

If there is payload included in the STREAM message, it is a push message to the server and the CoAP client is the streaming source. This scenario is illustrated in FIG. 20.

To stop streaming, the streaming option "StopMode" should be included in the streaming Option. Alternatively, there could be a "STREAMON" and a "STREAMOFF" methods respectively for starting and stopping streaming.

Figure 19:
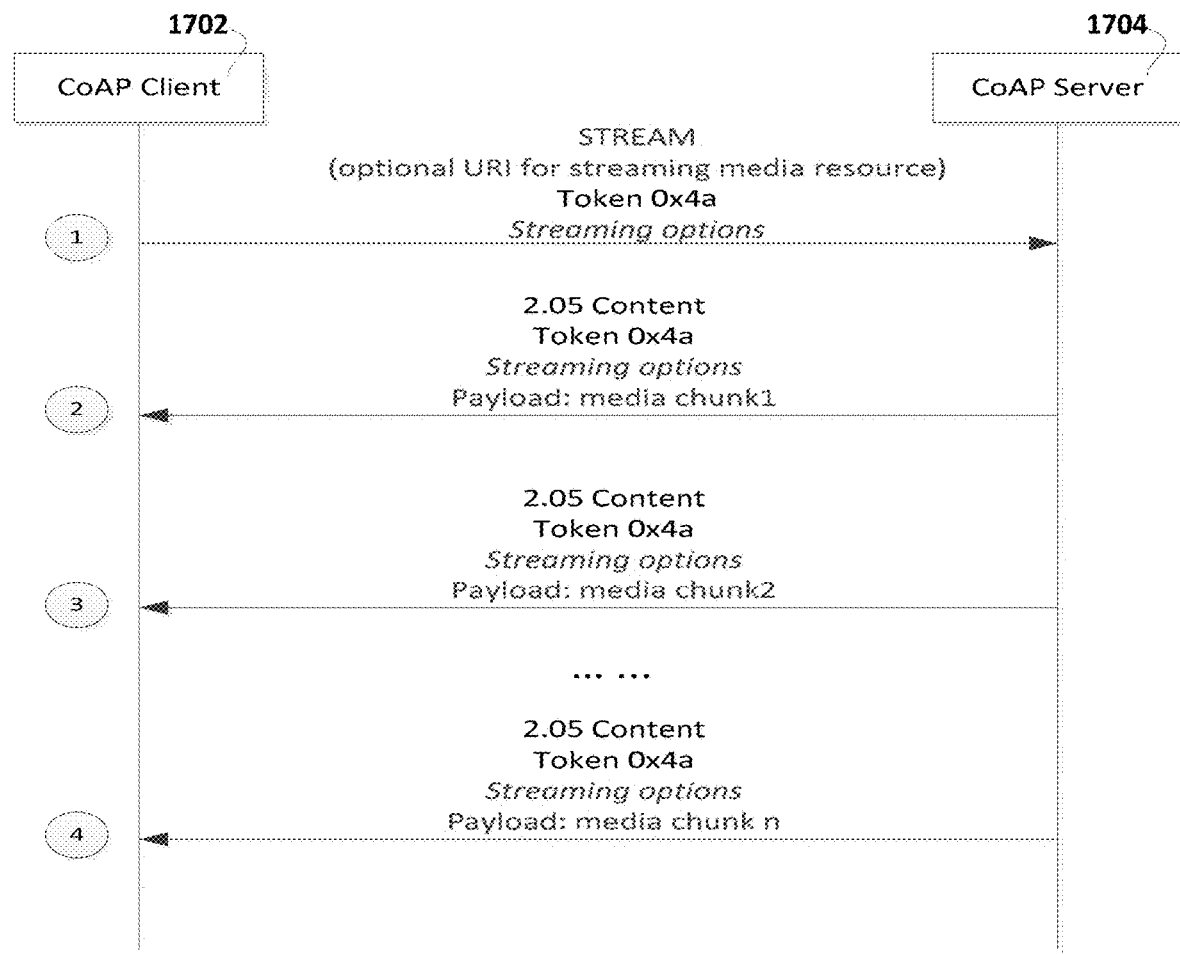
FIG. 19 is a diagram illustrating using STREAM Method (Request-Response).

In Step 1 of FIG. 19, the CoAP client triggers the streaming operation by sending a CoAP request message using the STREAM method. The client 1702 may include a URI pointing to the resource where the streaming media is stored. When the client 1702 and server 1704 are both constrained and there can be just one default streaming source location, and the client 1702 is not aware of the location. In this case, the client 1702 does not specify the streaming URI and the server 1704 will use the default streaming source. Optionally, the client may also include one or multiple options to define the parameters of the streaming.

In Step 2 of FIG. 19, upon receiving the request, the CoAP server 1704 provides the streaming contents in the format of small file chunks. The server 1704 may also optionally include streaming options to let the client 1702 know about the current streaming capabilities and preferences of the server 1704.

Error codes defined in the CoAP base protocol can be used for error cases. In cases that the server does not support the STREAM method, the server 1704 should return 4.05 Method Not Allowed. In cases that no media streaming file is located at the URI specified by the client, the server should return 4.04 Not Found.

In Step 3-Step 4 of FIG. 19, the streaming operation will continue until either the specified time expired, or the CoAP server sends all the chunks. The Requests and Responses are mapped using the same Token. The CoAP client 1702 can also explicitly stop the streaming operation by sending a STREAM request with the option sets as "StopMode".

It is understood that the entities performing the steps illustrated in FIG. 19 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 19 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 19. It is also understood that any transmitting and receiving steps illustrated in FIG. 19 may be performed by communication circuitry of the apparatus under control of the processor of the apparatus and the computer-executable instructions (e.g., software) that it executes.

In Step 1 of FIG. 20, the CoAP client 1702 initiates the streaming push operation by sending a CoAP request using the STREAM method. The client 1702 includes media chunks in the payload. Optionally, the client 1702 may also include one or multiple options to define the parameters of the streaming. Prior to this step of operation, the CoAP client 1702 may need to exchange streaming options with the server 1704, for example, the CoAP client 1702 needs to indicate the "StreamingMediaType" it supports.

In Step 2-Step 3 of FIG. 20, upon receiving the streaming push request, the CoAP server 1704 can process the payload based on its own logic. For example, the server 1704 may provide the media chunk to an application to display the media, and/or the server 1704 may choose to store the media chunk locally.

It is understood that the entities performing the steps illustrated in FIG. 20 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 20 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 20. It is also understood that any transmitting and receiving steps illustrated in FIG. 20 may be performed by communication circuitry of the apparatus under control of the processor of the apparatus and the computer-executable instructions (e.g., software) that it executes.

CoAP Observe was not designed for streaming purpose. It is a mechanism to support subscription and notification. A CoAP client 1702 can register itself with the CoAP server 1704 for interests in the state change of a resource over a period of time by issuing a GET request with the Observe option. Therefore to support streaming, some modifications are needed for Observe.

In the first enhancement, the CoAP server 1704 needs explicit indication that the Observe request is for streaming purposes and understands that it needs to push the streaming media to the client 1702. For live streaming, the state change would be constant. Therefore the CoAP server 1704 in Observe needs to be able to identify the constant state change of a resource and sends notifications. For on-demand streaming, on the contrary, the media chunks may be already available at the server 1704. Therefore from the server's perspective, there is no state change of the resource.

The CoAP streaming options can be used to resolve these issues. For example, if a CoAP client 1702 initiates a registration request for a resource, it indicates that it is for streaming by including a PlayMode option. The client 1702 can also include other streaming options to define the streaming operation.

In the second enhancement, the CoAP Observe draft also defines that the CoAP server 1704 follows a "best-effort approach for sending the current representation to the client after a state change". "The server will do its best to keep the resource state observed by the client as closely in sync with the actual state as possible". However, a client 1702 cannot rely on observing every single state that a resource might go through. For example, if the network is congested or the state changes more frequently than the network can handle, the server can skip notifications for any number of intermediate states." Basically the Observe method provide "best effort" QoS. However streaming requires different level of QoS. To resolve this issue, the CoAP client 1702 should include QoS related streaming options in its Observe registration request.

Table 3 compares the different CoAP streaming mechanisms discussed above. Comparing to using CoAP Observe, dedicated streaming mechanisms provide more flexibility for CoAP to support the streaming feature since Observe was not designed for streaming purposes. However, for CoAP end points that only support Observe, it might still be used with modifications of its behavior.

Note the destination of the streaming operation can be a multicast address using the multicast method defined in RFC 7252, The Constrained Application Protocol (CoAP) and RFC 7390 Group Communication for the Constrained Application Protocol (CoAP). The streaming request messages can be addressed to the group URI. For example, if the "/streaming" URI is used, the streaming destination will be "/group multicast URI/streaming". The streaming Options will apply to all group members.

TABLE 3

Comparison of Different CoAP Streaming Mechanisms

| CoAP Streaming Mechanisms | Using "/streaming" URI | Using STREAM method | Using Enhanced CoAP Observe described herein |
|---|---|---|---|
| Designed for streaming operations | Yes | Yes | No. Not designed for streaming, but may be used for streaming purposes with modifications |
| Impact to the current CoAP base protocol | Use existing method with new Options | Introduced a new method | Use existing Observe method with new Options and new behavior of Observe |
| Target of a Request message | By default operates on a reserved URI; may include the URI of a specific media resource | By default operates on the default streaming resource. May include the URI of a specific media resource | Target a specific resource to Observe |
| Suitable streaming operations | Any, live streaming and on-demand streaming | Any, live streaming and on-demand streaming | Intermittent streaming since Observe pushes updates of a resource based on changes |

Figure 21:
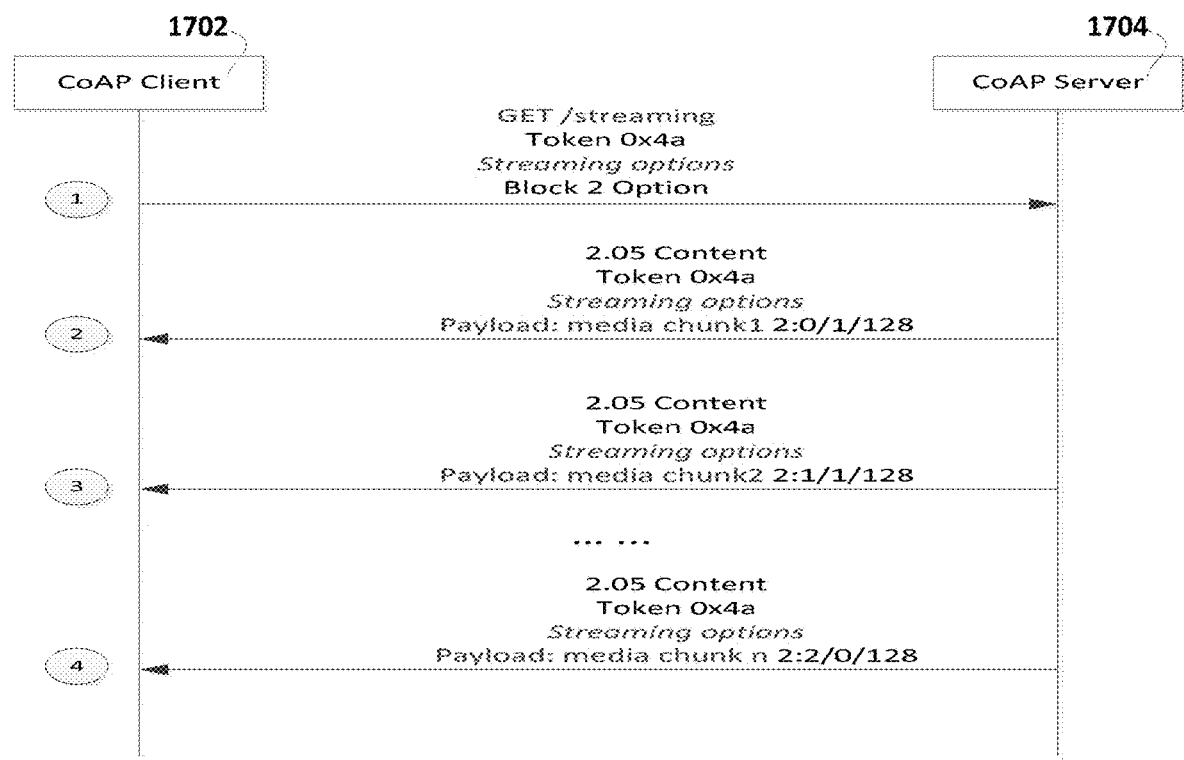
FIG. 21 is a diagram illustrating CoAP Streaming in Combination with CoAP Block Transfer.

The current CoAP block transfer mechanism can be combined together with the streaming mechanisms mentioned above. The current CoAP block transfer mechanism can be used to break down a media file into smaller media chunks and sent from one CoAP endpoint to another one. FIG. 21 illustrates the procedure involving Block transfer. One of the streaming mechanisms is used for illustration purpose and the concept applies to other streaming mechanism as well.

The new mechanisms supporting streaming are indicated in FIG. 20. These mechansims can also apply transmitting resources of big sizes, not limited to streaming.

Use the "/streaming" URI. Other mechanisms disclosed herein can be used as well.

Use the streaming options so the client and server can define and exchange streaming specific parameters Trigger push operations. In the current CoAP Block operation, each time the client needs to retrieve a block, it needs to send a Request message to the server. In the combined operation, push operation is enabled as shown in FIG. 21.

In Step 1 of FIG. 21, the procedure is the same as illustrated in FIG. 17. In the streaming request, the client indicates its request of media chunk size using the Block 2 option.

Step 2-Step 4 of FIG. 21 are the same as Steps 2-4 of FIG. 17, the CoAP server 1704 sends media chunks. It uses the Block options to indicate the size, sequence, and the end of the media file. Note that the CoAP server 1704 will push media chunks to the client since it is streaming operation.

It is understood that the entities performing the steps illustrated in FIG. 21 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 21 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 21. It is also understood that any transmitting and receiving steps illustrated in FIG. 21 may be performed by communication circuitry of the apparatus under control of the processor of the apparatus and the computer-executable instructions (e.g., software) that it executes.

Table 4 and Table 5 define exemplary new CoAP Options of one embodiment introduced to support CoAP streaming, following the format of the CoAP base protocol. The definitions of the Options are divided into two tables. Table 4 defines the Options and how they are used. Table 5 defines the format of the Options. When presented both in the request and response messages, the CoAP endpoints involved in the streaming operation can negotiate the settings so the streaming operation can be adaptive to the need of both endpoints. The Options in the following table are not exhaustive and can be extended or modified. The new options listed below define the essential parameters to be used to support streaming operations in one embodiment. More examples on how these Options can be used are discussed below Table 4.

TABLE 4

CoAP Streaming Options (part 1)

| CoAP Streaming Options | Descriptions | Meaning in a Request | Meaning in a Response |
|---|---|---|---|
| StreamingType | Indicate the specific mechanism that the CoAP endpoint supports. Choices are: 1) STREAM method 2) streaming URI 3) Observe 4) None. "None" indicates the endpoint does not support streaming. All other Options | Indicate the streaming mechanism the endpoint that sends the Request supports | Indicate the streaming mechanism the endpoint that sends the Response supports |

TABLE 4-continued

CoAP Streaming Options (part 1)

| CoAP Streaming Options | Descriptions | Meaning in a Request | Meaning in a Response |
|---|---|---|---|
| | should only be available if the end point supports streaming. An endpoint may support multiple mechanisms. | | |
| Duration | Time duration of the streaming operation. | If it is a request to trigger the streaming operation, it indicates how long the sender would receive the streaming operation. If it is a request to push streaming to the recipient, it indicates how long the push operation will last. | If the recipient does not agree on the Duration, it includes the Duration with a different value in the Response message to negotiate a different duration. |
| StartTime | The start time of a streaming operation. It can be used for delayed operation, or be used together with End Time to define the duration. If both "StartTime" and "EndTime" are used, "Duration" is not used. | If it is a request to trigger the streaming operation, it indicates the start time that the sender wants. | Indicates the StartTime that the sender of the Response wants. |
| EndTime | The end time of a streaming operation. It is only used in pairs with the StartTime. | If it is a request to trigger the streaming operation, it indicates the end time that the sender wants. | In a Response containing media chunk, the Endtime indicates the time streaming finishes. |
| Chunksize | The size of the media chunk per message contains. The server may process and produce the media in near real time so the media file was not already produced and chunk size can be changed. Or the server may have multiple media files with different chunk sizes. | Indicates the chunk size the sender of the Request supports. | Indicates the chunk size the sender of the Response supports. |
| Totalsize | The total size (e.g. bytes) of the media streaming. This can be used to control the overall content being streamed. | Indicates the total size the sender of the Request supports. | Indicates the total size the sender of the Response supports. |
| StreamingMediaType | Defines media type (codecs) used for the current streaming operation, such as wmv, mpeg. | If the sender of the Request is triggering streaming, it indicates the media type that it will support. If the Request is pushing media chunks, it indicates the type of the media chunk. | Indicates the media type of the media chunks that is sent. |
| PlayMode | Indicates the PLAY operation for streaming. | If Observe is used for streaming, the CoAP client includes this Option to indicate it is for streaming. It is also used to play after pause. | Used to resume playing after pause. |
| PauseMode | Indicates the PAUSE operation for streaming. | The sender of the request requires the pause of the streaming operation. | The sender of the response requires the pause of the streaming operation. |
| StopMode | Indicates the STOP operation for streaming. | The sender of the request requires the stop of the streaming operation. | The sender of the response requires the stop of the streaming operation. |
| FileDuration | Indicates the total duration in time (e.g. seconds) that the streaming media file the end point has. This Option is used with the "PositionTime". | The sender of the request queries the FileDuration, or provides the value if it is a push request. | The sender of the response provides the value based on the request. |

TABLE 4-continued

CoAP Streaming Options (part 1)

| CoAP Streaming Options | Descriptions | Meaning in a Request | Meaning in a Response |
|---|---|---|---|
| PositionTime | When an endpoint knows the FileDuration, it may specify a PositionTime to skip certain contents. Indicates the position by time (e.g. in seconds) for rewind and fast forward. | The sender of the request to require playing from a specific time stamp in the media. | The sender of the response to require playing from a specific time stamp in the media. |
| PositionPercent | Indicates the relative position by percent (e.g 1-100) for rewind and fast forward. | The sender of the request to require playing from a specific relative position in the media. | The sender of the response to require playing from a specific relative position in the media. |
| Protocol | Indicates the protocols (UDP, TCP) to be used. Since UDP traffic may be blocked due to firewalls, if a device supports CoAP over TCP, TCP can be used for streaming. | The sender of the Request asks to switch to another protocol. For example, the sender may want to use CoAP/TCP for streaming. | The sender of the Response asks to switch to another protocol. For example, the sender may want to use CoAP/TCP for streaming. |
| Connection | Indicates if CoAP connection should be used. | The sender of the Request asks to enable CoAP connection. | The sender of the Response asks to enable CoAP connection. |
| Resolution | Indicates the video resolution. There can be predefined levels of resolution. | Indicates the resolution level that the sender of the request message requires. | Indicates the resolution level that the sender of the response message requires. |
| Quality | This is a generic parameter that defines the streaming quality. Specific levels of quality can be pre-defined. | Indicates the quality level that the sender of the request message requires. | Indicates the quality level that the sender of the response message requires. |
| Delay | Indicates the Delay time (e.g. in seconds) before the next chunk. Optionally or alternatively, delay variant (jitter) may be used | Indicates the Delay that the sender requires, or if it is a push operation, indicates the estimated delay the sender offers. | Same meaning as in the Request message, initiated by the CoAP server. |
| Reliability | This parameter indicates if reliability is required. This can trigger the CoAP client and server to use CoAP confirmable message model if reliability is required. Otherwise, CoAP non-confirmable model can be used to reduce message exchanges. | Indicates the requirement on reliability from the CoAP client. | Indicates the reliability can be offered from the CoAP server. |
| Intermittent | Indicates if the streaming operation is intermittent, which means the server will send the streaming content for a certain duration of time (defined by intermitInterval below). The Duration is defined as well, indicating the Duration of the streaming period. | The sender of the Request requires streaming to be sent intermittently (e.g. like the case c in FIG. 15), or if it is push operation, it indicates the recipient to expect intermittent streaming contents. | Same meaning as in the Request message, initiated by the CoAP server. |
| IntermitInterval | Indicates the time (e.g. in seconds) between each intermittent streaming. This option much be used together with the "Intermittent" option. | Indicates the interval between sesuctive intermittent streaming the sender requires, or that the sender offers in the push operation. | Same meaning as in the Request message, initiated by the CoAP server. |
| Buffer | Indicates if the streamed content is buffered or not. | In a Request to trigger streaming, the sender indicates if it | Not applicable |

TABLE 4-continued

CoAP Streaming Options (part 1)

| CoAP Streaming Options | Descriptions | Meaning in a Request | Meaning in a Response |
|---|---|---|---|
| BufferSize | Indicates the buffer size (e.g. in the unit of bytes). It is only used when Buffer is set to "1 (Yes)". | will buffer the streamed content or not. Provides the buffer size to the server so that server can adapt its streaming parameters avoiding over load the sender's buffer. | Not applicable |
| Source | This only applies to a non-push operation. If this Option is not included, be default the source of the streaming should be the server of the Request. This Option is used to appoint a different endpoint as the source of the streaming. Note that it is assumed that the source can be addressed. | If this Option is included, the sender of the Request appoints a different endpoint as the source of the streaming. | Not applicable |
| Destination | This only applies to a non-push operation. The endpoint that sends the request can indicate one or more destinations (rather than itself), as the recipients of the streaming. | If this Option is included, the sender of the Request appoints one of more different destinations. So the recipient of the Request should stream to those endpoints. | Not applicable |
| StreamCharacteristics | This only applies to a non-push operation. This Option is used as a wild card string to describe and discover the stream file satisfying the characteristics. | The sender uses this Option as a filter to find the streaming files that match the characteristics. | Not applicable |

The Options introduced in Table 4 can be used individually (unless indicated that it must be used with other Options) or combined to achieve adaptive streaming operations. This is important for IoT devices since their capacity can be limited to process streaming content and their conditions can change more often.

In one example, the CoAP client 1702 sends a streaming request with the "Buffer" Option set to "1" (Yes). After a while, the server 1704 is sending the contents very fast, with a short interval between chunks, and the buffer is getting full. The client 1702 sends a request including the Option "Delay", which increases the interval as defined by the value of "Delay" between two messages carrying consecutive media chunks.

In another example, a CoAP endpoint residing on a constrained device receives streaming contents. At certain point, the device cannot process the streaming contents being pushed to it. The CoAP endpoint sends a request with the Option "Intermittent" set to "1" (Yes) and it also include the "IntermitInterval" and "Duration" to define how often and how long it will receive the streaming content each time. By doing so the client 1702 can regulate the streaming content it receives.

Table 4 also defines a set of play mode options. They work together for the case when the server has the media file ready for streaming (i.e. on demand, not real time). A CoAP client 1702 can start streaming by sending a request to the server, using the STREAM method. Then after a while the client 1702 may want to pause the operation for a period of time, for example, the client 1702 goes to sleep mode. The client 1702 can send another Request using the PauseMode Option. Upon receiving it, the server 1704 stops sending the media chunks, but the server 1704 will keep where the streaming was paused, awaiting for it to be resumed. The server 1704 may keep an internal timer of expiration for exception case if it does not receive a resume Request again. To resume the paused operation, the client sends a Request with "PlayMode". In addition, the client 1702 may indicate where it wants to play by including a "PositionTime" or "PositionPercent" value.

Between the CoAP client 1702 and server 1704, they can also jump back and forth in the media content by using the "Position Time" and "PositionPercent". These options work for the cases when the endpoint already has the media file created. The client 1702 can request to jump forward or backward in the media file by specifying a time (e.g. 10 seconds) or a relative position (e.g. 25% of the file).

Table 5 defines the Options in the same way as Table 4 in the CoAP protocol. Note that each option in Table 5 (or Table 4) can be added as a new link format or a new attribute of a resource being maintained by the Resource Directory (RD). In other words, when a CoAP endpoint (e.g. a client) registers its resources to RD, it can append those streaming-related options for the resource if it can be streamed. Later, another CoAP client can go to the RD to discover those streaming-related options for a particular resource.

TABLE 5

CoAP Streaming Options (part 2)

| CoAP Streaming Options | Critical | Safe to forward | CacheKey | Repeat | Format | Length (byte) | Default |
|---|---|---|---|---|---|---|---|
| StreamingType | Y | Y | N | N | String | 0-4 | none |
| Duration | N | Y | N | N | Uint | 0-8 | none |
| StartTime | N | Y | N | N | String | 0-8 | none |
| EndTime | N | Y | N | N | String | 0-8 | none |
| Chunksize | N | Y | N | N | Uint | 0-4 | none |
| Totalsize | N | Y | N | N | Uint | 0-8 | none |
| StreamingMediaType | N | Y | N | N | Unit | 0-4 | none |
| PlayMode | N | Y | N | N | String | 0-1 | none |
| PauseMode | N | Y | N | N | String | 0-1 | none |
| StopMode | N | Y | N | N | String | 0-1 | none |
| FileDuration | N | Y | N | N | Uint | 0-8 | none |
| PositionTime | N | Y | N | N | Uint | 0-8 | none |
| PositionPercent | N | Y | N | N | Uint | 0-1 | none |
| Protocol | N | Y | N | N | String | 0-4 | UDP |
| Connection | N | Y | N | N | String | 0-1 | 0 (no CoAP connection) |
| Resolution | N | Y | N | N | Uint | 0-4 | none |
| Quality | N | Y | N | N | Uint | 0-4 | none |
| Delay | N | Y | N | N | Uint | 0-4 | none |
| Reliability | N | Y | N | N | Boolean | 0-1 | 0 (indicates no reliability requirement) |
| Intermittent | N | Y | N | N | Boolean | 0-1 | 0 (no intermittent streaming) |
| Buffer | N | Y | N | N | Boolean | 0-1 | 0 (streamed content is not buffered) |
| BufferSize | N | Y | N | N | Uint | 0-8 | none |
| Source | N | Y | N | N | String | 0-8 | none |
| Destination | N | Y | N | N | String | 0-8 | none |
| StreamCharacteristics | N | Y | N | N | String | 0-255 | none |

Figure 22:
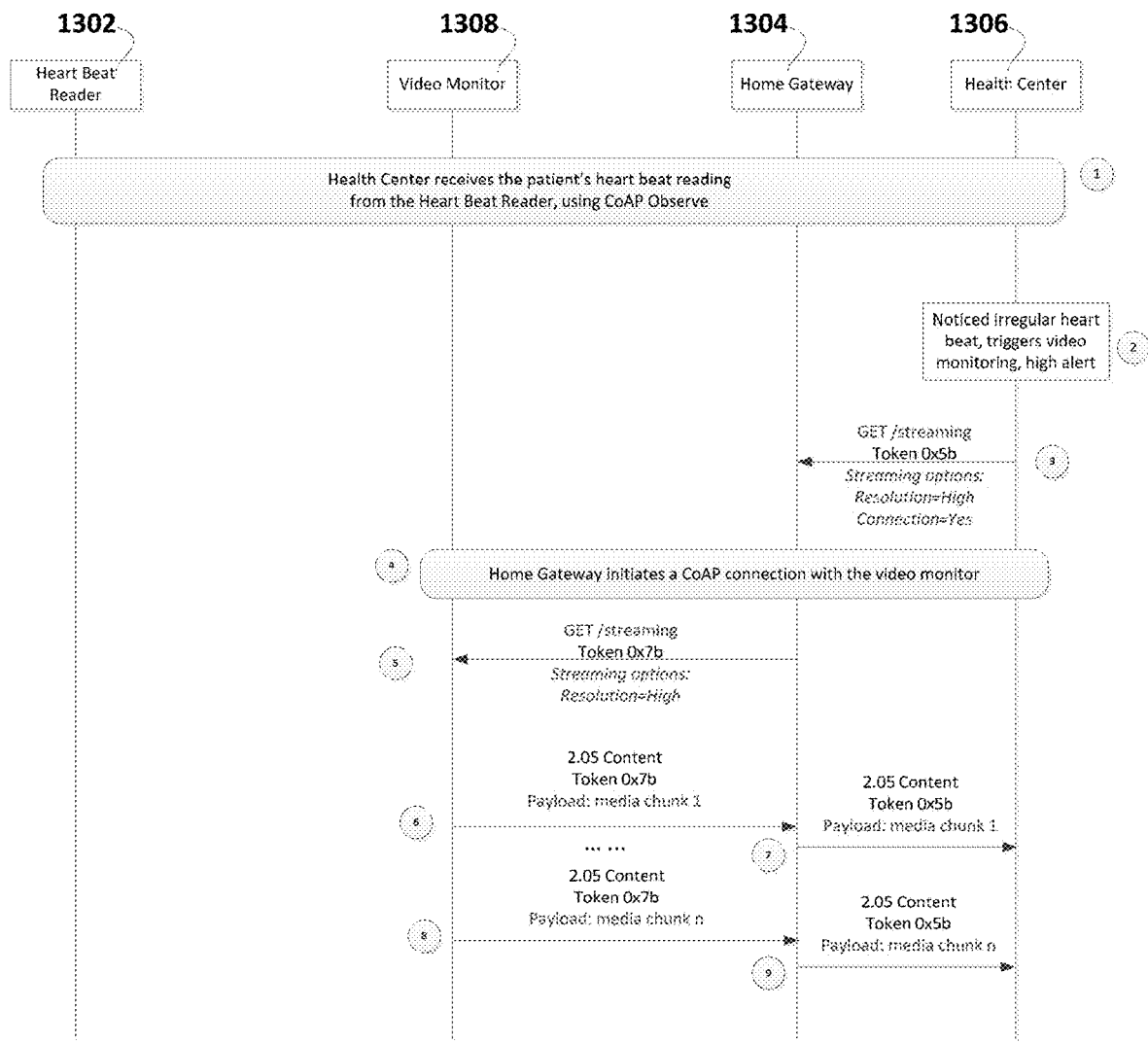
FIG. 22 is a diagram illustrating triggering of CoAP Streaming.
Figure 23:
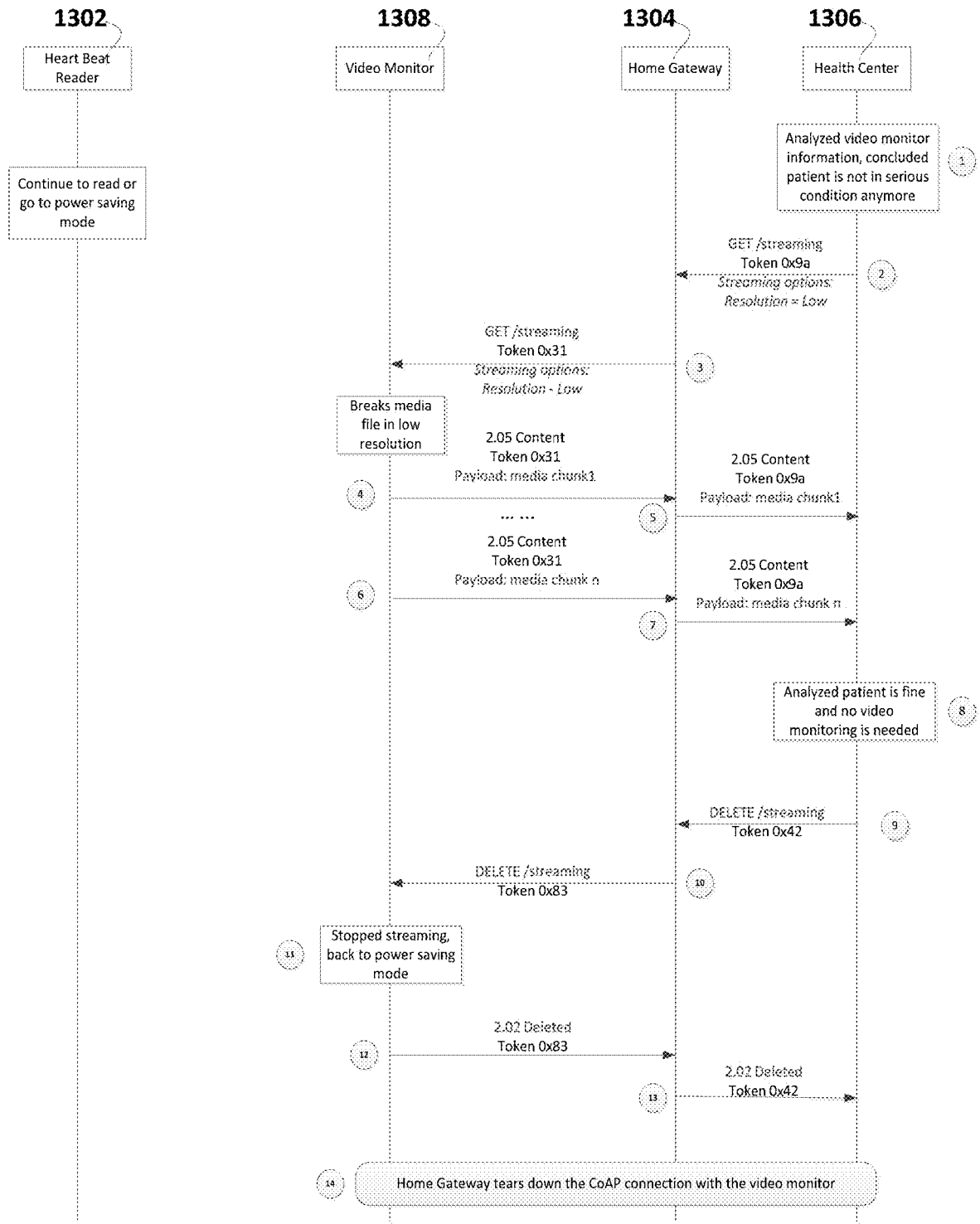
FIG. 23 is a diagram illustrating Adaptive CoAP Streaming.

FIG. 22 and FIG. 23 illustrate examples using the above mechanism and Options to support streaming operations. The eHealth use case mentioned above with respect to FIG. 13 is re-used in this example to show how the CoAP streaming mechanisms can resolve the issues mentioned earlier in this use case. The call flows also illustrate the adaptive nature of the mechanism. For example, as shown in the figures below, streaming operation can be started or ended, and the streaming parameters can be updated based on the streaming Options.

In Step 1 of FIG. 22, the health center control machine 1306 supports CoAP. It initiates a CoAP Observe registration request for the home gateway 1304 at a patient's house. The home gateway 1304 acts as a CoAP proxy and sends the request to the sensor 1302 that the patient is wearing which can read the patient's heart beat.

The sensor 1302 sends notifications of multiple readings as defined by CoAP Observe. The home gateway 1304 forwards the results to the health center control machine 1306.

There is a video monitor 1308 installed at the patient's home. However, during a normal situation the monitor 1308 is in power saving mode and not used all the time. This can also reduce network traffic.

In Step 2 of FIG. 22, the health center control machine 1306 (or health workers using the machine) analyzes the patient's heart beat readings over a period of time, and noticed that the heart beat is too high. The control machine 1306, based on its own logic, decides to trigger video monitoring to this patient.

In Step 3 of FIG. 22, the health center control machine 1306 uses the mechanism discussed above to trigger streaming. Since it considers the patient's condition as serious, it requires streaming using CoAP connection by setting the "Connection" Option to "Yes". It also requires high resolution for video chunks by setting the Resolution Option to "High". Note that the Resolution setting may also be the absolute resolution value.

In Step 4 of FIG. 22, the home gateway establishes a proxy based CoAP connection, using the mechanisms. The use of CoAP connections can improve the transmission reliability and efficiency at the CoAP layer. Note that before the home gateway can establish a CoAP connection with the video monitor, the video monitor must have waken up. It can be triggered by means of device triggering, such as by using infrared.

In Step 5 of FIG. 22, the home gateway uses the mechanism discussed with respect to FIG. 17 to trigger streaming from the video monitor.

In Steps 6-9 of FIG. 22, the video monitor sends media chunks to the health center according to the configuration.

It is understood that the entities performing the steps illustrated in FIG. 22 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 22 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 22. It is also understood that any transmitting and receiving steps illustrated in FIG. 22 may be performed by communication circuitry of the apparatus under control of the processor of the apparatus and the computer-executable instructions (e.g., software) that it executes.

FIG. 23 shows the procedure that health center adjusted streaming configuration and eventually terminated streaming.

In Step 1 of FIG. 23, while video streaming is on (i.e. the patient is on high alert monitoring), the heart beat reader 1302 may continue to send heart beat values, or may be switched to power saving mode. Other sensors might be triggered (not shown) to enhance the overall monitoring level. The health center control machine 1306 analyzed the video chunks as well as other readings from the patient over a period of time, and made the assessment that the patient is getting better and not in a serious condition.

In Step 2-Step 3 of FIG. 23, the control machine 1306 initiates the change of streaming to low resolution. The home gateway 1304 configures the video monitor.

In Step 4-Step 7 of FIG. 23, the video monitor 1308 sends media chunks in low resolution.

In Step 8 of FIG. 23, after a period of time, the streaming video results indicated that the patient is safe and no video streaming is needed.

In Step 9 of FIG. 23, the control machine 1306 initiates the termination of streaming, using DELETE towards the/ streaming location. Note that in an alternative way, the machine 1306 can send another GET/streaming request, and include "StopMode"

In Step 10-13 of FIG. 23, the video streaming is deleted and the video monitor 1308 is back to power saving mode.

In Step 14 of FIG. 23, since the video streaming is stopped, the home gateway 1304 tears down the CoAP connection.

It is understood that the entities performing the steps illustrated in FIG. 23 are logical entities that may be implemented in the form of software (i.e., computer-executable instructions) stored in a memory of, and executing on a processor of, a network apparatus or computer system such as those illustrated in FIG. 26C or FIG. 26D. That is, the method(s) illustrated in FIG. 23 may be implemented in the form of software (i.e., computer-executable instructions) stored in a memory of a network apparatus, such as the apparatus or computer system illustrated in FIG. 26C or FIG. 26D, which computer executable instructions, when executed by a processor of the apparatus, perform the steps illustrated in FIG. 23. It is also understood that any transmitting and receiving steps illustrated in FIG. 23 may be performed by communication circuitry of the apparatus under control of the processor of the apparatus and the computer-executable instructions (e.g., software) that it executes.

Figure 24:
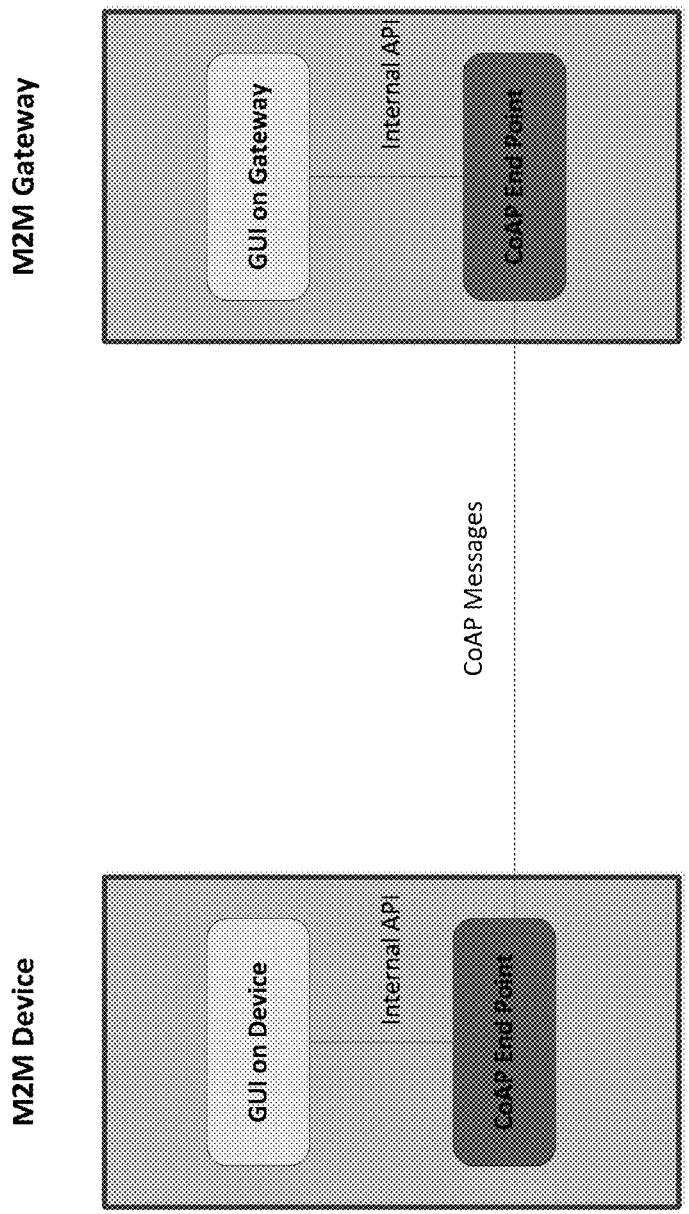
FIG. 24 is a diagram illustrating an exemplary user interface.

FIG. 24 shows an M2M/IoT device and gateway that each supports CoAP. In one embodiment, A GUI interface on the device or gateway can obtain CoAP operational information via an internal API to the software stack running the CoAP endpoint. Therefore the GUI interface would be able to show the CoAP operations, for example, it can show that a STREAM request has been received, with certain streaming Options included. The GUI may use filter to select what information it will illustrate.

Figure 25:
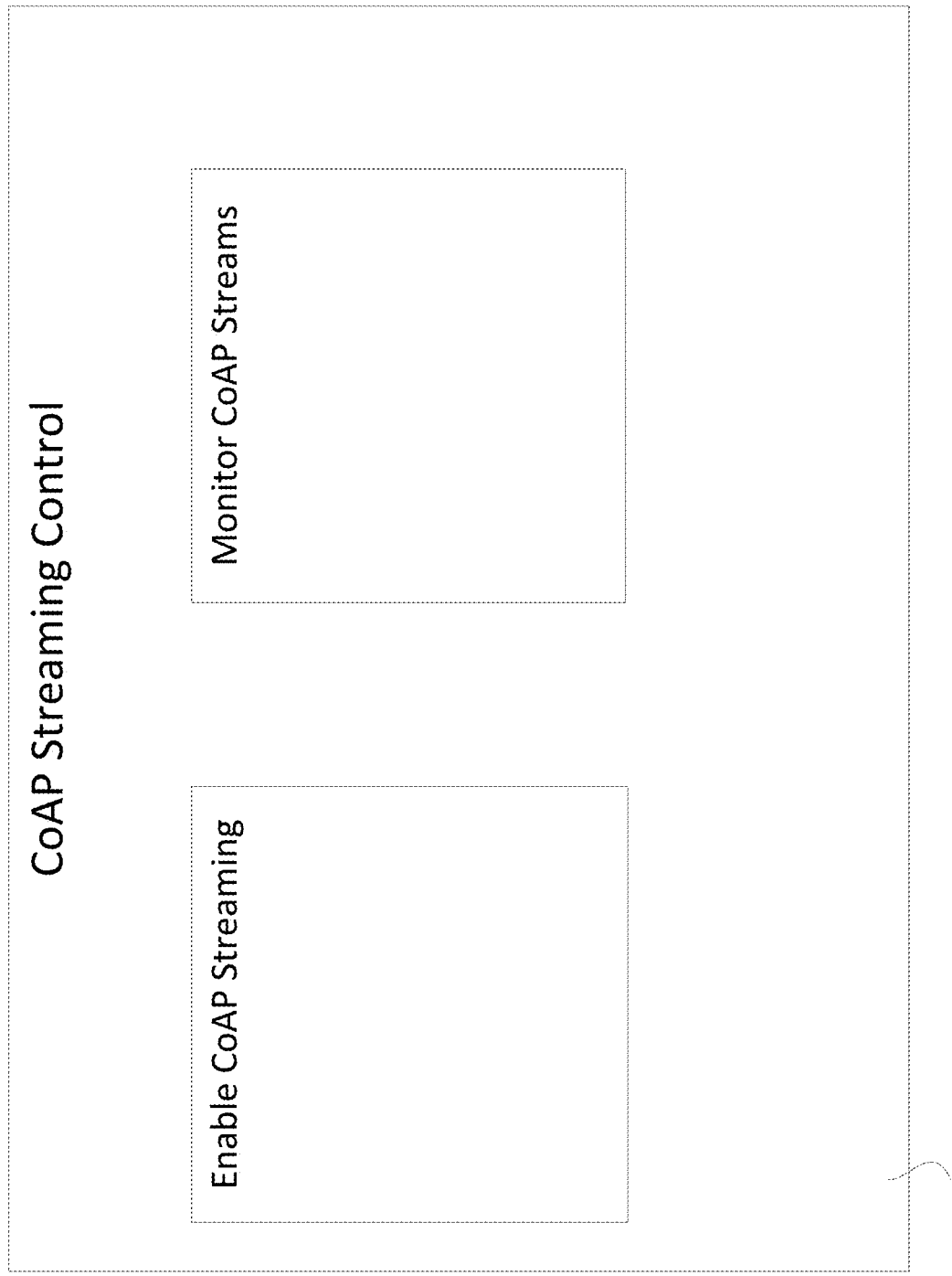
FIG. 25 is a diagram that illustrates an exemplary graphical user interface for use with embodiments.

Interfaces, such as Graphical User Interfaces (GUIs), can be used to assist user to control and/or configure functionalities related to CoAP streaming mechanisms. FIG. 25 is a diagram that illustrates an interface 2500 that allows a user to enable and monitor COAP streaming. It is to be understood that interface 2500 can be produced using displays such as those shown in FIGS. 26C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 26A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as CoAP client 1702, CoAP server 1704, heartbeat monitor 1302, video monitor 1308, home gateway 1304 and health center 1306 as well as logical entities to produce interfaces such as interface 2500.

As shown in FIG. 26A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 26A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 26B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as CoAP client 1702, CoAP server 1704, heartbeat monitor 1302, video monitor 1308, home gateway 1304 and health center 1306 as well as logical entities to produce interfaces such as interface 2500. The M2M service layer 22 may be implemented by one or more servers, computers, devices, virtual machines (e.g. cloud/storage farms, etc.) or the like, including for example the devices illustrated in FIGS. 26C and 26D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 26B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node or apparatus (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as CoAP client 1702, CoAP server 1704, heartbeat monitor 1302, video monitor 1308, home gateway 1304 and health center 1306 as well as logical entities to produce interfaces such as interface 2500 may be hosted within a M2M service layer instance hosted by an M2M node, such as an M2M server, M2M gateway, or M2M device, as shown in FIG. 26B. For example, the logical entities such as CoAP client 1702, CoAP server 1704, heartbeat monitor 1302, video monitor 1308, home gateway 1304 and health center 1306 as well as logical entities to produce interfaces such as interface 2500 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 26C or FIG. 26D described below.

Further, logical entities such as CoAP client 1702, CoAP server 1704, heartbeat monitor 1302, video monitor 1308, home gateway 1304 and health center 1306 as well as logical entities to produce interfaces such as interface 2500 can implemented as part of an M2M network that uses a Service Oriented Architecture (SOA) and/or a Resource-Oriented Architecture (ROA) to access services of the present application.

FIG. 26C is a block diagram of an example hardware/software architecture of a M2M network node 30, such as an M2M device 18, an M2M gateway 14, an M2M server, or the like. The node 30 can execute or include logical entities such as CoAP client 1702, CoAP server 1704, heartbeat monitor 1302, video monitor 1308, home gateway 1304 and health center 1306 as well as logical entities to produce interfaces such as interface 2500. The device 30 can be part of an M2M network as shown in FIG. 26A-B or part of a non-M2M network. As shown in FIG. 26C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 26C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 26C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 26C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 26D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as CoAP client 1702, CoAP server 1704, heartbeat monitor 1302, video monitor 1308, home gateway 1304 and health center 1306 as well as logical entities to produce interfaces such as interface 2500. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM)

93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 26A and FIG. 26B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 26 A-B or the device 30 of FIG. 26 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as CoAP client 1702, CoAP server 1704, heartbeat monitor 1302, video monitor 1308, home gateway 1304 and health center 1306 as well as logical entities to produce interfaces such as interface 2500 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
   send, via the communication network to an other apparatus on the network, a Constrained Application Protocol (CoAP) request message comprising a plurality of fields wherein a first field from the plurality of fields comprises an indication of a STREAM command and at least one CoAP option field from the plurality of fields that indicates parameters for receiving the streaming content comprising at least a StreamingMediaType parameter, wherein the StreamingMediaType parameter defines a media type; and
   receive, via the communication network from the other apparatus on the network, a plurality of response messages, wherein each response message comprises a chunk of the resource comprising the streaming content in accordance with the parameters for receiving the streaming content.

2. The apparatus of claim 1, wherein the first field of the CoAP request message comprises a URI of the resource.

3. The apparatus of claim 1, wherein the computer-executable instructions, when executed by the processor of the apparatus, further cause the apparatus to:
   send, via the communication network to the other apparatus on the network, a second CoAP request message comprising a CoAP option to delay receiving a next chunk of the resource comprising the streaming content.

4. The apparatus of claim 1, wherein the computer-executable instructions, when executed by the processor of the apparatus, further cause the apparatus to:
   send, via the communication network to the other apparatus on the network, a second CoAP request message comprising a CoAP option indicating a position of the streaming content; and receive, via the communication network from the other apparatus on the network, a next chunk of the resource comprising the indicated position of the streaming content.

5. The apparatus of claim 1, wherein the CoAP option fields indicate at least one of: a duration to receive the streaming content; a time to begin receiving response messages comprising the streaming content; a time to stop receiving response message comprising the streaming content; a size of the chunk of the resource of each response message; a total size of the resource to receive; a network protocol to use for sending the response messages; whether a CoAP connection should be used for sending the response messages; a resolution of the streaming content to receive; a quality of the streaming content to receive; whether the response messages should be confirmable messages; a time duration between successive response messages; a source apparatus to receive the response messages from; and one or more characteristics of the resource to receive.

6. The apparatus of claim 1, wherein the CoAP request message comprises a CoAP STREAM command, wherein the STREAM command indicates a trigger to initiate streaming from the other apparatus.

7. The apparatus of claim 1, wherein the set of CoAP option fields indicate the response messages should use a CoAP Observe protocol.

8. The apparatus of claim 1, wherein the set of CoAP option fields indicate the response messages should be CoAP STREAM messages.

9. The apparatus of claim 1, wherein the set of CoAP option fields indicate the response messages should use a CoAP block transfer protocol.

10. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
send, via the communication network to an other apparatus on the network, a first Constrained Application Protocol (CoAP) request message comprising a plurality of fields wherein a first field in the plurality of fields includes an indication of a request to send a resource comprising streaming content and at least one CoAP option field in the plurality fields that indicates parameters for receiving the streaming content comprising at least a StreamingMediaType parameter, wherein the StreamingMediaType parameter defines a media type; and
send, via the communication network to the other apparatus on the network, a plurality of request messages, wherein each request message comprises a chunk of the resource comprising the streaming content in accordance with the parameters for receiving the streaming content.

11. The apparatus of claim 10, wherein the first CoAP request message further comprises a URI of the resource.

12. The apparatus of claim 10, wherein the first CoAP request message comprises a CoAP PUT command.

13. The apparatus of claim 12, wherein one field of the set of CoAP option fields indicates a media type.

14. The apparatus of claim 12, wherein the first request message further comprises a first chunk of the resource comprising the streaming content.

15. The apparatus of claim 10, wherein the other apparatus makes the resource comprising the streaming content available for another apparatus.

16. The apparatus of claim 10, wherein the first CoAP request message comprises a CoAP STREAM command, wherein the STREAM command indicates streaming has been initiated from the apparatus.

17. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
receive, via the communication network from an other apparatus on the network, an indication of a CoAP resource comprising streaming content, the indication comprising a plurality of fields including a first field having an indicator of streaming content and a set of CoAP option fields set to indicate parameters associated with the streaming content including comprising at least a StreamingMediaType parameter, wherein the StreamingMediaType parameter defines a media type; and
send, via the communication network to the other apparatus on the network, the indication of the CoAP resource and the parameters associated with the streaming content.

18. The apparatus of claim 17, wherein the set of CoAP option fields indicate at least one of: a network protocol to use for sending response messages comprising the CoAP resource; whether a CoAP connection should be used for sending response messages comprising the CoAP resource; whether response messages comprising the CoAP resource should be confirmable messages; a source apparatus to receive the CoAP resource from; and one or more characteristics of the CoAP resource.

19. The apparatus of claim 17, wherein the set of CoAP option fields indicate a destination apparatus to receive the CoAP resource.

20. The apparatus of claim 17, wherein the set of CoAP option fields indicate a request to begin receiving the CoAP resource, and wherein the computer-executable instructions, when executed by the processor of the apparatus, further cause the apparatus to:
send, via the communication network to the other apparatus on the network, a CoAP response message comprising a first chunk of the CoAP resource in accordance with the parameters associated with the streaming content.

* * * * *